US012633698B2

(12) United States Patent
Cassar et al.

(10) Patent No.: US 12,633,698 B2
(45) Date of Patent: May 19, 2026

(54) ELECTRICAL CONNECTOR

(71) Applicant: Connecteurs Electriques Deutsch, Evreux (FR)

(72) Inventors: Thierry Cassar, Evreux (FR); Simon Delaire, Evreux (FR); Sébastien Queva, Evreux (FR); Martin Brunet, Evreux (FR); Samuel Soufflet, Evreux (FR)

(73) Assignee: Connecteurs Electriques Deutsch, Evreux (FR)

( * ) Notice: Subject to any disclaimer, the term of this patent is extended or adjusted under 35 U.S.C. 154(b) by 427 days.

(21) Appl. No.: 18/471,723

(22) Filed: Sep. 21, 2023

(65) Prior Publication Data

US 2024/0106150 A1 Mar. 28, 2024

(30) Foreign Application Priority Data

Sep. 22, 2022 (EP) .................................... 22306395

(51) Int. Cl.

| | |
|---|---|
| ***H01R 13/00*** | (2006.01) |
| ***H01R 13/44*** | (2006.01) |
| ***H01R 13/53*** | (2006.01) |
| ***H01R 13/629*** | (2006.01) |
| *H01R 13/03* | (2006.01) |

(52) U.S. Cl.

CPC ............ *H01R 13/44* (2013.01); *H01R 13/53* (2013.01); *H01R 13/62933* (2013.01); *H01R 13/03* (2013.01)

(58) Field of Classification Search

CPC .......................... H01R 13/53; H01R 13/62933

See application file for complete search history.

(56) References Cited

U.S. PATENT DOCUMENTS 5,512,833 A * 4/1996 Fukuda .................. H01R 43/22 439/489
5,877,622 A * 3/1999 Aoyama ................ G01R 31/66 324/538

(Continued)

FOREIGN PATENT DOCUMENTS

| | | | |
|---|---|---|---|
| CN | 110311257 | A | 10/2019 |
| JP | 2001135398 | A | 5/2001 |
| WO | 2017103398 | A1 | 6/2017 |

OTHER PUBLICATIONS

Extended European Search Report from the European Patent Office dated Jun. 14, 2023, corresponding to Application No. 22306395.9-1201, 20 pages.

(Continued)

*Primary Examiner* — Phuong Chi Thi Nguyen
(74) *Attorney, Agent, or Firm* — Barley Snyder

(57) ABSTRACT

An electrical connector includes a housing defining an internal connector space and mateable with a mating housing of a second electrical connector in a mating direction parallel to a mating axis, a pair of electrical contacts housed in the internal connector space and mateable with a plurality of second electrical contacts of the second electrical connector, and a lever housed in the internal connector space. A mechanical contact between the housing and the lever establishes a fulcrum of the lever. The fulcrum is arranged between the electrical contacts. A pivoting of the lever moves a position of the electrical contacts relative to the housing.

20 Claims, 17 Drawing Sheets

(56) References Cited

U.S. PATENT DOCUMENTS

| | | | | |
|---|---|---|---|---|
| 7,726,994 | B1 | 6/2010 | Willey | |
| 8,529,288 | B2 * | 9/2013 | Montena | H01R 13/5213 439/523 |
| 2007/0293071 | A1 * | 12/2007 | Takahashi | H01R 13/62933 439/157 |
| 2008/0311781 | A1 * | 12/2008 | Wojcik | H01R 13/506 439/352 |
| 2011/0123157 | A1 * | 5/2011 | Belsan | G02B 6/4292 439/523 |

OTHER PUBLICATIONS

Partial European Search Report from the European Patent Office dated Apr. 4, 2021, corresponding to Application No. 22306395.9-1201, 17 pages.

* cited by examiner

ELECTRICAL CONNECTOR

CROSS-REFERENCE TO RELATED APPLICATIONS

This application claims the benefit of the filing date under 35 U.S.C. § 119(a)-(d) of European Patent Application No. 22306395.9, filed on Sep. 22, 2022.

FIELD OF THE INVENTION

The present invention relates to an electrical connector configured to be mated with a second connector.

BACKGROUND

When the contact surfaces of metallic electrical contacts are engaged, the surface asperities of the respective surfaces adhere. Relative sliding motions of the contact surfaces lead to the breakdown of the adhering surface asperities, which generates wear debris. The term fretting corrosion refers to the incidence and subsequent oxidation of such wear debris on the contact surfaces of metallic electrical contacts under mechanical load.

The occurrence of fretting corrosion increases contact resistance, which may disturb electrical signal transmission and notably induces electric power losses to heat. Fretting corrosion also degrades material properties of the corroded materials under stress, such as fatigue strength. For example, fretting corrosion may increase the risk of crack appearance.

Meanwhile, the industry-wide push towards electrification of mobility translates to electrical connectors being increasingly implemented in vehicle applications not only for signal transmission, but also for electric power transmission. For example, high power connectors may be required to safely and reliably transfer direct electrical current of 50 A or higher.

At the same time, in many types of vehicles, in particular electric trains and aircraft, the dynamic environment may generate important vibrational loads on electric power transmission components. For example, continuous vibration oscillations are common in aircraft, with oscillation amplitudes ranging from the order of micrometres up to 10 mm.

Vibrational movements are transmitted from the vibration source to the electrical connections, composed of an electrical connector mated with a second electrical connector, in particular a plug connector mated with a receptacle connector. Consequently, the portions of the respective connector housings that are bottomed out and secured with each other move in conjunction. The mated electrical contacts of the respective connectors, however, still move relatively to each other and to the housings in which they are fit, in particular in view of variations of contact dimensions within manufacturing tolerance, which leads to the appearance of fretting corrosion.

This vibration-induced fretting corrosion in electrical connectors leads to the unwanted increase in ohmic contact resistance and the unwanted energy loss as heat.

For this reason, to this day, high power electrical connections are secured using high voltage compression lug connections. Lug connections typically include uninsulated exposed parts, which when under high voltage represent a safety risk to humans on one hand, as well as on the other hand a risk to the vehicle through electromagnetic radiation. In particular, the lack of insulation of the exposed parts limits the electric power to be transferred in accordance with the dielectric resistance of the surrounding gases, which can fluctuate with ambient humidity levels. As the lugs are only insulated by air gaps to the next lug and the metallic structure of the aircraft, they must be dimensioned to a relatively low voltage usage.

Furthermore, the installation of lug connections can be time-consuming and laborious. Dedicated tools are required for a deep cable stamping as well as for the initial connection fastening. A sequence of markings is often required to indicate completed installation steps. The heavy metallic high-power cables and lugs are cumbersome to manipulate, especially as it is usual for additional loops of excess cable to be allotted in anticipation of lug connection reparations that may be required. Incidentally, these additional cable loops add to the total mass of the vehicle and therefore reduce energy efficiency.

Moreover, as thermal expansion, vibrations and compression stress all wear on the lug connection, frequent refastening may be necessary to continue safe operation of the connection. Therefore, the requirements on preventative maintenance, including fastening checks and re-tightening, represent a cost factor on vehicle operation.

SUMMARY

An electrical connector includes a housing defining an internal connector space and mateable with a mating housing of a second electrical connector in a mating direction parallel to a mating axis, a pair of electrical contacts housed in the internal connector space and mateable with a plurality of second electrical contacts of the second electrical connector, and a lever housed in the internal connector space. A mechanical contact between the housing and the lever establishes a fulcrum of the lever. The fulcrum is arranged between the electrical contacts. A pivoting of the lever moves a position of the electrical contacts relative to the housing.

BRIEF DESCRIPTION OF THE DRAWINGS

Exemplary embodiments of the invention are described by way of the following drawings. In the drawings.

DETAILED DESCRIPTION OF THE EMBODIMENTS

The invention will be more completely understood and appreciated by careful study of the following more detailed description of the exemplary aspects and embodiments of the invention, taken in conjunction with accompanying drawings.

Figure 1A:
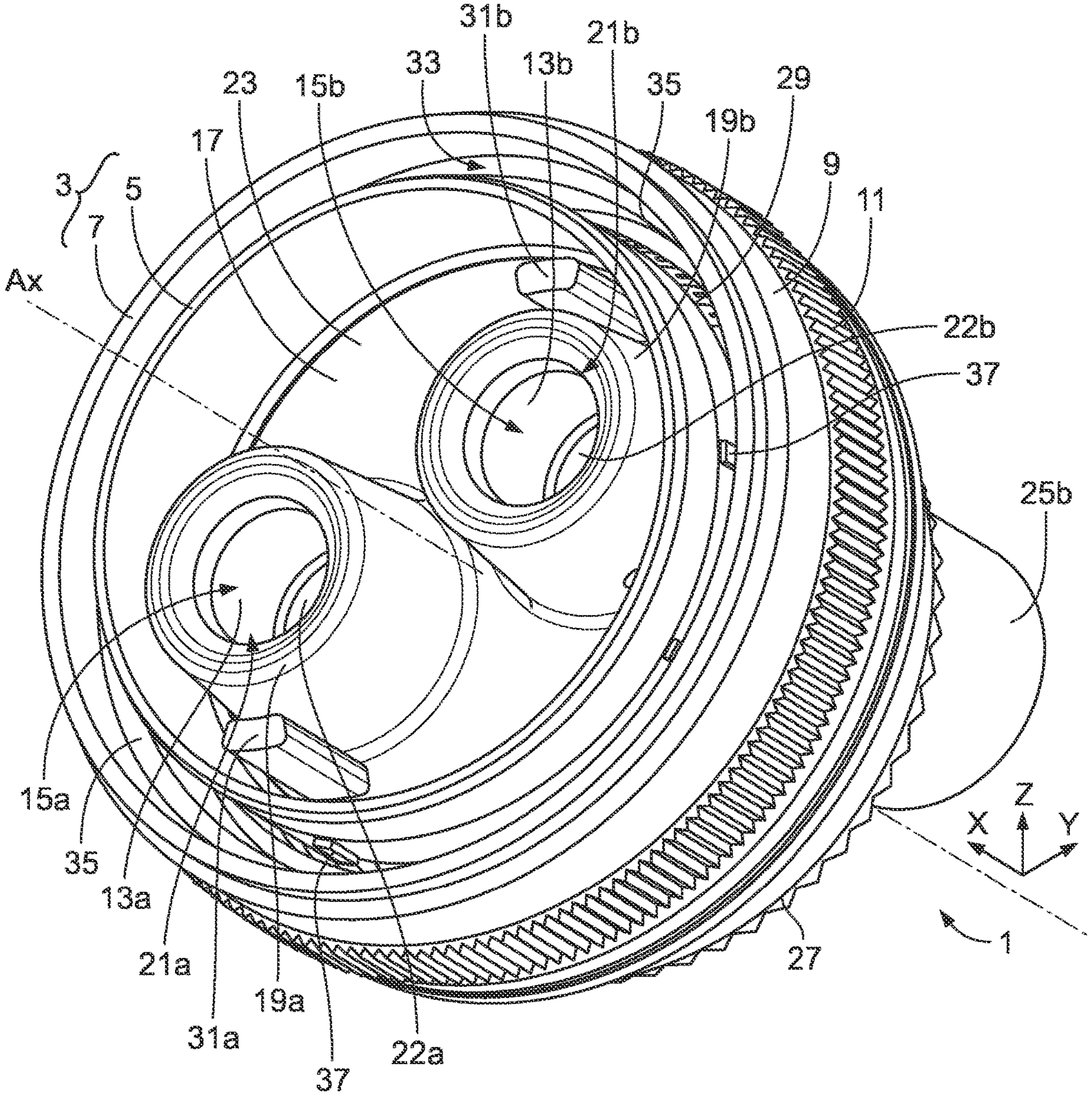
FIG. 1A shows a perspective view of an electrical connector according to an embodiment of a first aspect of the invention.

FIG. 1A shows a perspective view of an electrical connector 1 according to an embodiment of a first aspect of the invention. The electrical connector 1 is configured to be mated in the mating direction x parallel to the mating axis AX with a mating second connector, for example the second electrical connector illustrated in FIG. 1B.

In this embodiment, the electrical connector 1 is a mobile connector, also called plug connector, to be manually mated with a fixed, or immobile, mating second connector, also called receptacle connector. For example, the electrical connector 1 is suited to establish power transmission connection for a power cable in an electrical vehicle, e.g. an electrical aircraft.

The electrical connector 1 comprises a housing 3, including an inner shell 5 surrounded by an outer shell 7. The inner shell 5 and the outer shell 7 have concentric circular cross-sections. As will be explained further down, the outer shell 7 is rotatably arranged around the inner shell 5. The outermost surface 9 of the outer shell 7 comprises a rugged surface portion 11 for an improved manual grip for rotation of the outer shell 7 with respect to the inner shell 5.

The electrical connector 1 further comprises two electrical contacts 13*a*, 13*b* located inside the inner shell 5. The electrical contacts 13*a*, 13*b* are, in an embodiment, gold-plated or silver-plated copper contacts for improved conductance and corrosion-resistance properties. In this embodiment, the electrical contacts 13*a*, 13*b* are female contacts, or socket contacts, comprising cylindrical receptacles 15*a*, 15*b* configured to receive male contacts of a mating second connector. However, in alternative embodiments, the electrical contacts 13*a*, 13*b* can be male contacts to be received in corresponding female contacts.

The electrical contacts 13*a*, 13*b* extend inside the housing 3 in parallel to the mating axis AX and the receptacles 15*a*, 15*b* are configured to receive mating male contacts extending in a direction opposed to the mating direction x.

The inner shell 5 has a circular opening facing in the mating direction x, in which a thermoplastic electrical insulation body 17 is disposed, such that it separates an internal space of the inner shell 5 from the outside environment in a sealed and electrically insulated way. The insulation body 17 is disposed in the y-z plane perpendicular to the mating direction x, and comprises two hollowed-out cylindrical protrusions 19*a*, 19*b*, each protrusion 19*a*, 19*b* comprising an opening 21*a*, 21*b* providing a passageway through the insulation body 17 into the internal space of the inner shell 5.

The electrical contacts 13*a*, 13*b* are disposed in the protrusions 19*a*, 19*b* of the insulation body 17 such that the respective receptacles 15*a*, 15*b* of the contacts 13*a*, 13*b* match the openings 21*a*, 21*b* in the insulation body 17. In particular, the openings 21*a*, 21*b* are configured to receive male electrical contacts of a mating second connector during mating, and to achieve the abutment of male distal end surfaces of the male electrical contacts with the female mating surfaces 22*a*, 22*b* of the connector 1, as will be described further down.

An interfacial surface 23 of the insulation body 17 serves as an engagement surface with the mating second connector when mated. In a fully mated state and, when the electrical connection of the connector 1 with a mating connector is electrically energized, the insulation body provides electrical insulation between conducting elements, in particular between the electrical contacts 13*a*, 13*b*, and the connector housing 3.

Two contact sleeves 25*a*, 25*b* (25*a* not visible on FIG. 1A), also called locking inserts, extend from the internal space of the inner shell 5 in parallel to the mating axis AX in a direction opposed to the mating direction x. As will be explained with respect to FIGS. 2A and 2B, the contact sleeves 25*a*, 25*b* are hollowed out to hold the electrical contacts 13*a*, 13*b*. The sleeves 25*a*, 25*b* are used to fit and lock the electrical contacts 13*a*, 13*b* in the housing 3.

FIG. 1A further illustrates a jagged outer circumferential ridge 27 of the outer shell 7, a metallic band 29 for radiofrequency interference filtering and two safety pins 31*a*, 31*b*. The safety pins 31*a*, 31*b* represent an optional safety feature to prevent mating of the connector 1 with a mating second connector in a case where the electrical contacts 13*a*, 13*b* or the contact sleeves 25*a*, 25*b* are not fully locked in the inner shell 5.

In the view of FIG. 1A, the electrical contacts 13*a*, 13*b* or the contact sleeves 25*a*, 25*b* are not fully locked in the housing 3, which is indicated by the safety pins 31*a*, 31*b* protruding from the housing 3 in the mating direction x. The safety pins 31*a*, 31*b* protrude to block mating with a mating second connector while the electrical contacts 13*a*, 13*b* are not fully locked in the housing 3. In particular, the protruding safety pins 31*a*, 31*b* are configured to abut against a housing of a mating second connector.

On the other hand, in a case in which the electrical contacts 13*a*, 13*b* and the contact sleeves 25*a*, 25*b* are fully locked in the housing 3, the safety pins 31*a*, 31*b* are retracted inside the inner shell 5 by means of a pre-loaded spring arrangement. While the safety pins 31*a*, 31*b* are retracted inside the inner shell 5, they lock and secure the contact sleeves 25*a*, 25*b* holding the contacts 13*a*, 13*b* in position. When the contact sleeves 25*a*, 25*b*, are in the locked and secured position, their position can only be freed again using an application-specific tool. This tool will be described in more detail with reference to FIG. 8. A view of the connector 1 with locked and secured sleeves 25*a*, 25*b* is illustrated in FIG. 1D.

The metallic band 29 is disposed on an outside surface of the inner shell 5 and is visible in a shell interspace 33 between the concentric inner and outer shells 5, 7. Inside the shell interspace 33, a shell threading of the outer shell 7 provides a threaded surface portion 35. Specifically, the threaded surface portion 35 is arranged circumferentially on an inner tubular wall of the outer shell 7. The threading extends along the mating axis AX and serves for the mating of the connector 1 in a mating direction x when engaged with a matching threaded portion of a mating second connector.

In this embodiment, the threaded surface portion 35 is a nut-side threading, or nut thread, forming a threaded receptacle configured to be matched with a screw-side threading, or screw thread, on an outer surface of a mating second connector. However, in alternative embodiments, the electrical connector could comprise a screw-side threading on an outer surface of the inner shell 5, to be matched with a nut-side threading of another mating second connector.

The outer circumferential ridge 27 faces in the direction opposed to the mating direction x and is jagged, thereby presenting triangular teeth. The teeth of the jagged ridge 27 provide an interface to accessories to be installed on connector 1 for a tooth-by-tooth tightening or screwing control of the connector 1 during mating and coupling with a mating second connector.

In addition, centering keys 37 are provided on the outer surface of the inner shell 5. The centering keys 37 are arranged to form fit into mating features in a mating second connector to simplify alignment with said mating second connector.

Figure 1B:
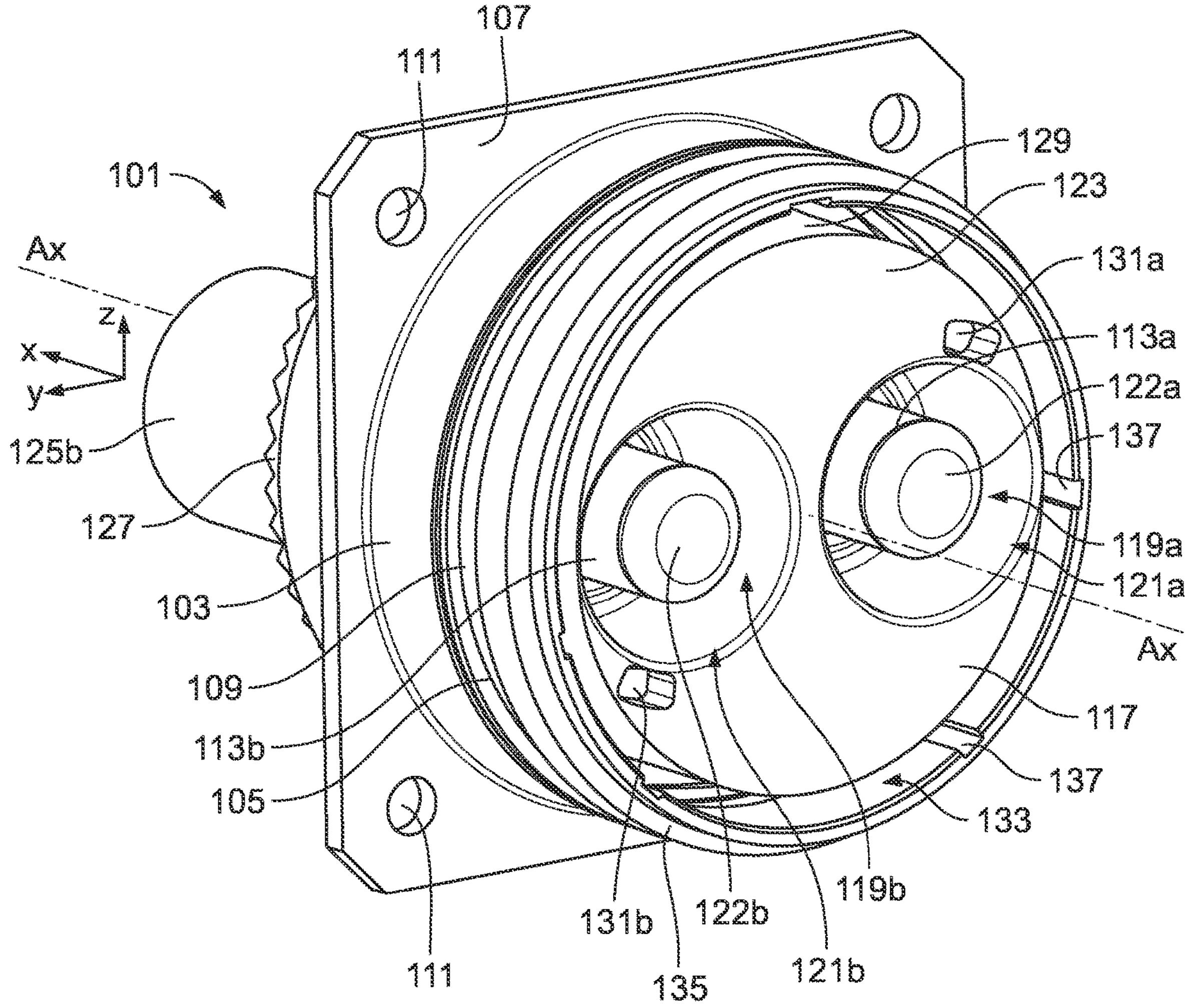
FIG. 1B shows a connector configured to be mated with the electrical connector of FIG. 1A.

FIG. 1B shows a second electrical connector 101 that is a suitable mating second connector for the mating with the electrical connector 1 of the embodiment described with reference to FIG. 1A. The second connector 101 is a fixed, or immobile, mating second connector, also called receptacle connector, and comprises a mating housing 103, which comprises a shell 105 and a baseplate 107. The baseplate 107 comprises through holes 111 for screw fixation of the baseplate 107, for example to a body panel.

On an outermost surface 109 of the shell 105, a threaded surface portion 135 is arranged circumferentially to provide a screw-side threading to form a threaded plug. The threaded surface portion 135 extends along the mating axis AX and thus matches the threading of the threaded surface portion 35 of the electrical connector 1. In variants of the invention, instead of a threaded surface portion 135, the surface portion can comprise for example a friction-fit device or a clipping device.

Inside the shell 105 of the housing 103, an interfacial insulation body 117 presenting a mating interfacial surface 123 is arranged. The interfacial insulation body 117 is an elastomer that is arranged to seal and electrically insulate the connection. The interfacial insulation body 117 comprises two cylindrical hollows 119*a*, 119*b* extending along the mating axis AX and traversing the interfacial surface 123 in the hollow openings 121*a*, 121*b*. Male electrical contacts 113*a*, 113*b* are disposed in the hollows 119*a*, 119*b* of the insulation body 117 and are accessible through the hollow openings 121*a*, 121*b*. The contacts 113*a*, 113*b* are corresponding mating electrical contacts with respect to the contacts 13*a*, 13*b* of the connector 1. The extremities of the male contacts 113*a*, 113*b* comprise distal end surfaces 122*a*, 122*b*, which extend in a y-z plane orthogonal to the mating direction x. The contacts 113*a*, 113*b* are held in contact sleeves 125*a*, 125*b* form-fitted in the housing 103, only sleeve 125*b* being visible on FIG. 1B.

In one embodiment, the cylindrical hollows 119*a*, 119*b* in the insulation body 117 can each comprise a plurality, for example three, ring-shaped ribs circumferentially arranged. When the protrusions 19*a*, 19*b* of the connector 1 are inserted in the respective hollows 119*a*, 119*b*, the electrical connection is thus water sealed.

The insulation body 117 of the second connector 101 is installed in the inner shell 5 of the connector 1 such that an annular interspace 133 is formed between the circumferential surface 129 of the insulation body 117 and the shell 105. The annular interspace 133 is configured to receive the inner shell 5 of the housing 3 of the connector 1 during mating of the connectors 1, 101.

Like the electrical connector 1, the second connector 101 comprises two safety pins 131*a*, 131*b* configured to prevent mating in a case where the electrical contacts 113*a*, 133*b* or the contact sleeves 125*a*, 125*b* are not fully locked in the housing 103. In the view of FIG. 1B, the electrical contacts 113*a*, 133*b* and sleeves 125*a*, 125*b* are fully locked in the housing 103, which is indicated by the safety pins 131*a*, 131*b* being retracted inside the inner shell 105. In particular, they are retracted by a pre-loaded spring arrangement. In a case in which an electrical contact 113*a*, 133*b* was not fully locked, a respective safety pin 131*a*, 131*b* would extend in the direction opposed to the mating direction x and block mating, as described and shown on the electrical connector 1 described with respect to FIG. 1A.

An outer circumferential ridge 127 of the shell 105 facing in the mating direction is jagged comparably to the ridge 27 of the first connector 1. Further, centering dents 137 are formed in the shell 105 facing towards the annular interspace 133, configured to receive the centering keys 37 of the connector 1 and to establish a form fit. In particular, during mating, the form fit between the centering keys 37 and the centering dents 137 blocks rotational movement between inner shell 5 of the connector 1 and the shell 105 of the second connector 101, so as to allow for a mating of the connectors 1, 101 by a screwing of the outer shell 7 around the shell 105 of the connector 101. In addition, the keys 37 and dents 137 simplify correct coupling.

Figure 1C:
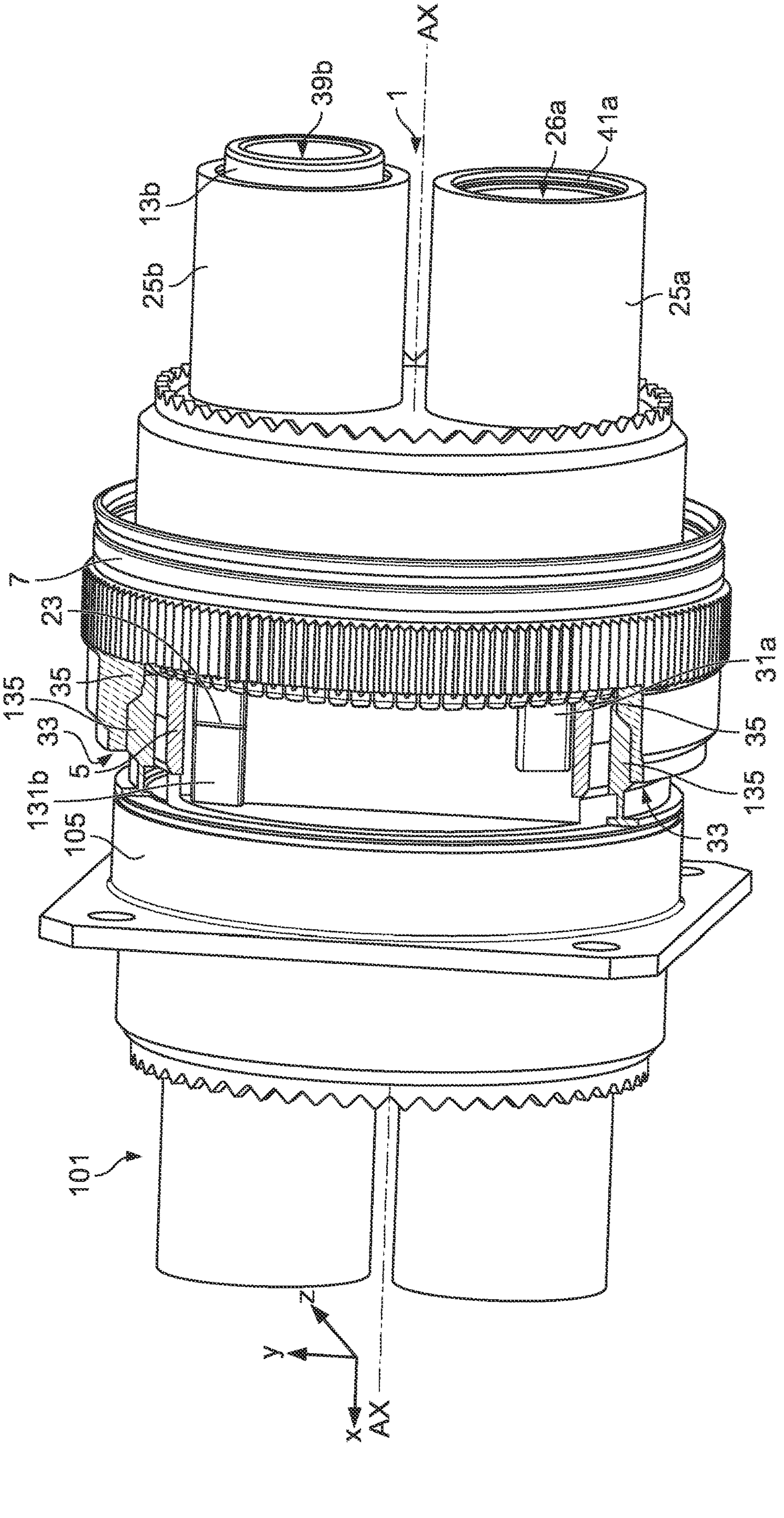
FIG. 1C shows the electrical connector of FIG. 1A and the second connector of FIG. 1B in an intermediate mating state.
Figure 1D:
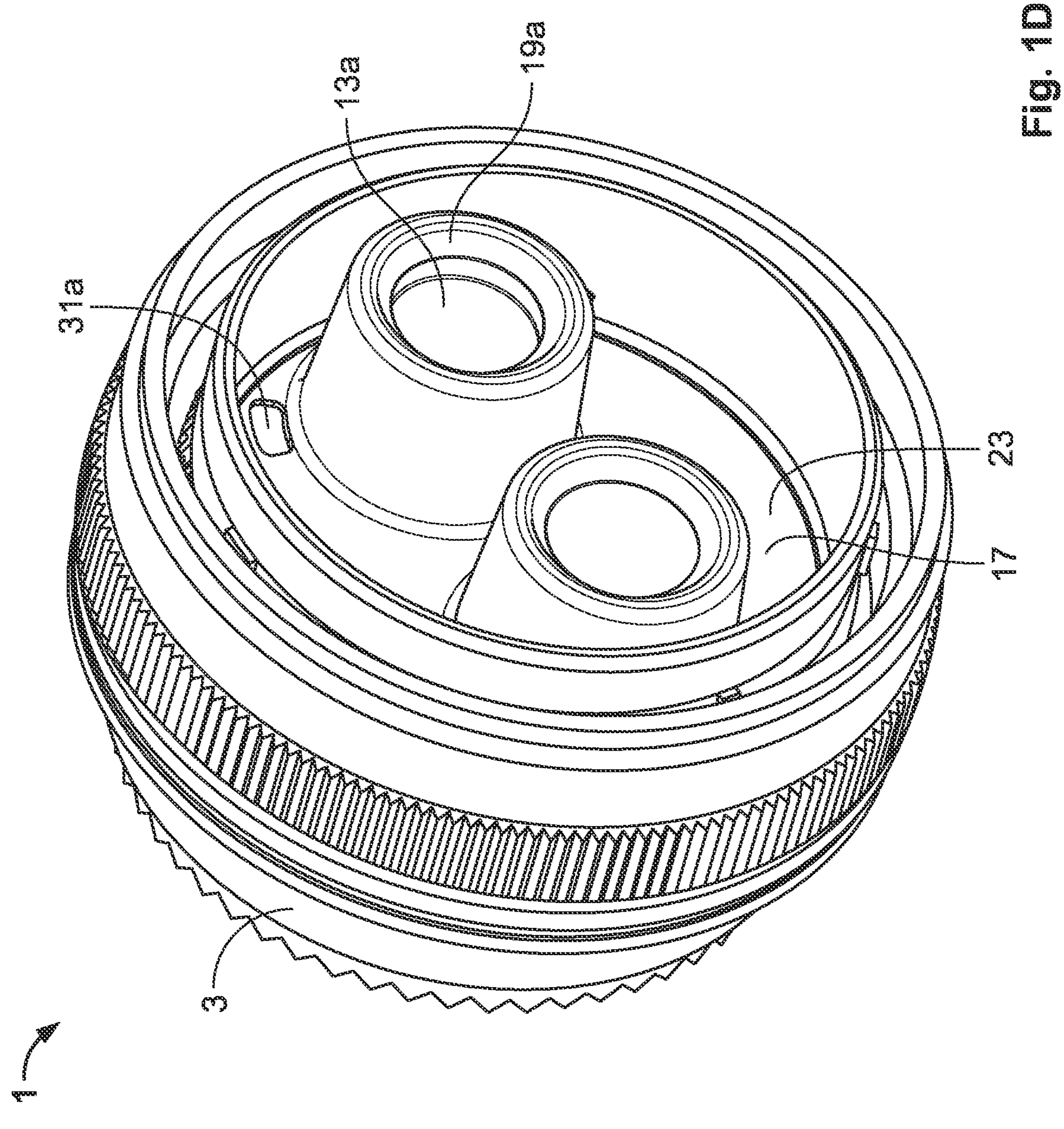
FIG. 1D shows a different perspective view the electrical connector of FIG. 1A, in which the connector has retracted safety pins.

FIG. 1C illustrates the electrical connector 1 of FIG. 1A and the second connector 101 of FIG. 1B in an intermediate mating state of assembly. For visibility purposes, corresponding angular sections of the outer shell 7 and the inner shell 5 of the first connector 1, as well as of the shell 105 of the second connector 101, have been removed to visualize internal components and describe the intermediate mating state.

In FIG. 1C, the mobile connector 1 has been moved towards the second connector 101. Thereby, the shell 105 of the second connector 101 was inserted in the shell interspace 33 between the inner and outer shells 5, 7 of the connector 1, and the inner shell 5 was inserted in the annular interspace 133 between the insulation body 117 and the shell 105 of the second connector. However, in this intermediate mating state, the threaded surface portion 35 on the outer shell 7 of the connector 1 has not yet reached the threaded surface portion 135 on the shell 105 of the second connector 101.

Therefore, the respective screw thread and nut thread cannot grip, and the mating cannot progress.

Indeed, FIG. 1C shows a fictional illustrative example in which contact sleeves 25*a*, 25*b* are not correctly locked with their respective electrical contacts 13*a*, 13*b* in the housing 1. For example, in the example of FIG. 1C, the contact 13*a* is absent or missing, and the contact 13*b* is "loose" and protruding outwards from the contact sleeve 25*b* in the direction opposite to the mating direction x, indicating that the contact 13*b* is only partially inserted and not fully locked in the contact sleeve 25*b*. The exemplary position of contact 13*b* serves only to illustrate an incorrect locking in the housing 1 and does not correspond to a typical stationary state of the contacts 13*a*, 13*b* in the sleeves 25*a*, 25*b*.

FIG. 1C shows that a wiring receptacle 39*b* is formed in an end of the contact 13*b*. In particular, it is formed in an end that is opposed to the end in which the receptacle 15*b* is formed. The wiring receptacle 39*b* is configured to receive a wire of a high-power cable. The structure of the wiring receptacle 39*b* is more clearly visible and described in regard to FIG. 2A.

FIG. 1C further illustrates that a seal element 41*a* is provided in an internal hollow 26*a* inside the contact sleeve 25*a*. The seal element 41*a* is used to seal the passage of a high power cable inserted in the internal hollow 26*a* of the contact sleeve 25*a*, to be attached to a wiring receptacle of the electrical contact 13*a*. The seal element 41*a* is a triple barrier grommet, suited in particular for a round wire of a high power cable. Alternatively, a stronger sealing system like e.g. a gland/bushing solution can be used.

Because the contact sleeves 25*a*, 25*b* of the electrical connector 1 are not fully and properly locked in the housing 3, the safety pins 31*a*, 31*b* are fully expanded, as also shown in FIG. 1A. Similarly, the safety pins 131*a*, 131*b* of the second electrical connector 101 are expanded to protrude in the direction opposed to the mating direction x, which indicates that the contacts 113*a*, 113*b* or the sleeves 125*a*, 125*b* are not fully locked in the housing 103. The expanded safety pins 131*a*, 131*b* abut against the interfacial surface 23 of the insulation body 17 of electrical connector 1, preventing the threads 35, 135 of the respective connectors 1, 101 from gripping and thus blocking the mating as long as one of the contact is not properly securely locked For illustration purposes, FIG. 1D shows the electrical connector 1 from a different perspective from FIG. 1A. In particular, FIG. 1D shows the connector 1 in the case in which the electrical contact 13*a* is fully locked with the contact sleeve 25*a* (not visible in FIG. 1D) in the housing 3 and correctly positioned in the protrusion 19*a*. Thus, and in contrast to the case of FIG. 1A, the safety pin 31*a* is fully retracted in the housing 3 and does not protrude from the interfacial surface 23 of the insulation body 17. Therefore, the safety pin 31*a* does not block connector 1 from being mated with a mating second connector, for example the second electrical connector 101 as illustrated on FIG. 2A.

Figure 2A:
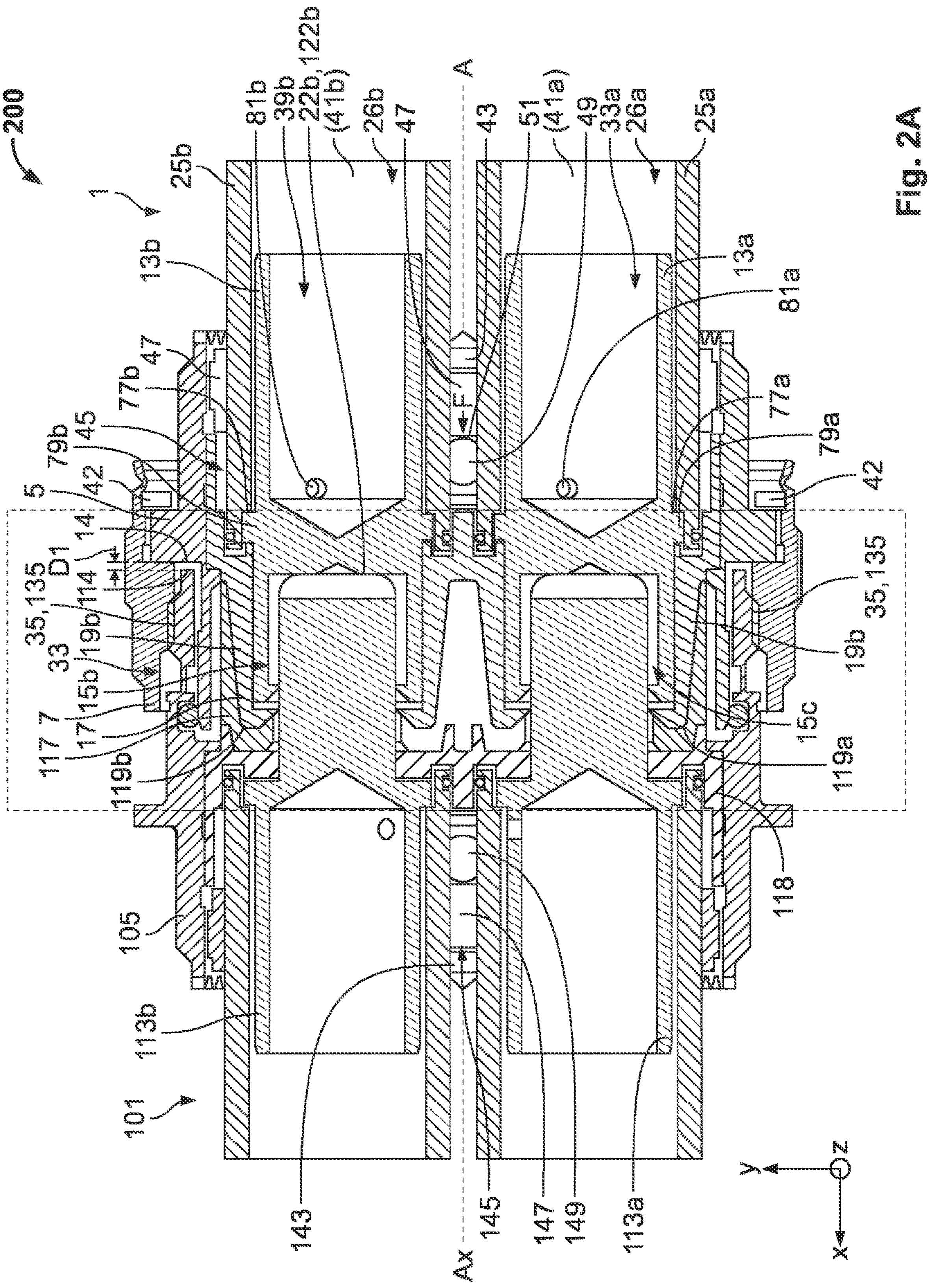
FIG. 2A shows a first cross-sectional view of the electrical connector of FIGS. 1A, 1D, and the second connector of FIG. 1B, in a mated state.

FIG. 2A shows a connector assembly 200 in a fully mated state, the assembly 200 comprising the electrical connector 1 and the second electrical connector 101 described above. FIG. 2A is a first cross-sectional view of the connectors 1, 101 along the x, y plane as shown in FIG. 1C.

The cross-sectional view of FIG. 2A shows that a frictional ring 42 is disposed in between the substantially tubular inner and outer shells 5, 7. In particular, the frictional ring 42 is disposed circumferentially around the inner shell 5 such that it is in partial frictional contact with the outer shell 7. The partial frictional contact provides increased resistance against unwanted rotational movement of the outer shell 7 around the inner shell 5. The connectors 1, 101 can further comprise an additional anti-decoupling device, for example a clicker-nut system or a ball-lock system. The anti-decoupling device maintains the outer shell 7 in statically place in a given rotational state with respect to the inner shell 5.

The inner shell 5 defines, together with the insulation body 17 and a backside cover 43, an internal connector space 45 of the connector 1.

Inside the internal connector space 45 are provided a pusher element 47 and a lever 49. The contact sleeves 25*a*, 25*b* hold the female electrical contacts 13*a*, 13*b* in respective internal hollows 26*a*, 26*b* of the sleeves 25*a*, 25*b*. The contact sleeves 25*a*, 25*b* extend through an opening in the backside cover 43 at least partially into the internal connector space 45. The pusher element 47 and lever 49 are in mechanical contact at a single interface point of contact, defining a fulcrum 51.

The structural features of pusher element 47 and lever 49, as well as their arrangement inside the internal connector space will be described in detail with respect to FIGS. 2B to 2D.

The sleeves 25*a*, 25*b* lock the contacts 13*a*, 13*b* in place in the respective insulation body protrusions 19*a*, 19*b* of the insulation body 17 by a form fit device. In particular, the contacts 13*a*, 13*b* are locked against the insulation body 17 by internal circumferential ledges 77*a*, 77*b* matching circumferential protrusions 79*a*, 79*b* on the external surface of the contacts 13*a*, 13*b*. The ledges 77*a*, 77*b* and protrusions 79*a*, 79*b* will be described further in reference to FIG. 2D. Only when the contacts 13*a*, 13*b* are fully locked in place by respective contact sleeves 25*a*, 25*b* do the safety pins 31*a*, 31*b* of FIG. 1A retract inside the internal space 45.

The wiring receptacles 39*a*, 39*b* are formed in the extremities of the contacts 13*a*, 13*b* that are opposed to the extremities in which the receptacles 15*a*, 15*b* are formed. The wiring receptacles 39*a*, 39*b* extend in parallel to the mating axis AX inside the electrical contacts 13*a*, 13*b* and are configured to receive high power conductor cable terminations. Through holes 81*a*, 81*b* in the electrical contacts 13*a*, 13*b* lead into the wiring receptacles 39*a*, 39*b* and facilitate a visual verification of the positioning of wire terminations in the wiring receptacles 39*a*, 39*b* of the contacts 13*a*, 13*b*.

Further, each internal hollow 26*a*, 26*b* of the respective contact sleeve 25*a*, 25*b* is provided with a triple barrier grommet 41*a*, 41*b*. The grommets 41*a*, 41*b* are configured to prevent water from entering into contact with electrically conducting surfaces when high power conductor cable are mounted to the contacts 13*a*, 13*b*.

In this embodiment, a pusher element 147 and a lever 149 are arranged in an internal space 145 of the second connector 101 as in the electrical connector 1. The internal space 145 is formed by the shell 105, the insulation body 117, and a backside cover 143, as in the electrical connector 1. Additionally, a secondary insulation 118, for example a thermoplastic like insulation body 17, disposed between the insulation body 117 and the contacts 113*a*, 113*b* provides additional electrical insulation. However, in a variant, the second connector can also be connector without pusher element 147 and lever 149.

In the mated state of FIG. 2A, the outer shell 7 has been screwed over the shell 105 of the second connector by matching the threaded portions 35, 135.

According to the invention, the protrusions 19*a*, 19*b* of the insulation body 17 of the connector 1 are received in the hollows 119*a*, 119*b* of the second connector 101 such that the male contacts 113*a*, 113*b* of the second connector 101 are received in the receptacles 15*a*, 15*b* of the female contacts 13*a*, 13*b*. Further according to the invention, the electrical contacts 13*a*, 13*b* are bottomed out with the respective male contacts 113*a*, 113*b* by virtue of the abutment of distal end surfaces 122*a*, 122*b* against the female mating surfaces 22*a*, 22*b*. In contrast thereto, the housing 3 of the first connector 1 and the housing 103 of the second connector 101 are separated by a gap D1 between a terminal surface 14 of the inner shell 5, at the bottom of the shell interspace 33, and a mating terminal surface 114 of the shell 105 of the second connector. The surfaces 14, 114 are separated by the gap D1 and are thus not bottomed out.

As will be further clarified in the following, this is achieved by dimensioning the contacts 13*a*, 13*b* to abut before the housings 3, 103, in particular before the surfaces 14, 114. In particular, when the outer shell 7 is screwed on the shell 105 of the second connector 107, the rotational movement is transferred as translational movement to the pusher 49 and concentrated from the pusher element 47 through the fulcrum 51 on the lever 49. The lever in turn distributes the mating force to the contact-holding sleeves 25*a*, 25*b* in accordance with the respective lengths of the contacts 13*a*, 13*b*, 113*a*, 113*b* within manufacturing tolerance, that is, in accordance with respective abutment locations of contact pairs 13*a*-113*a*, 13*b*-113*b* along the mating axis AX, until all pairs 13*a*-113*a*, 13*b*-113*b* are bottomed out with each other.

Figure 2C:
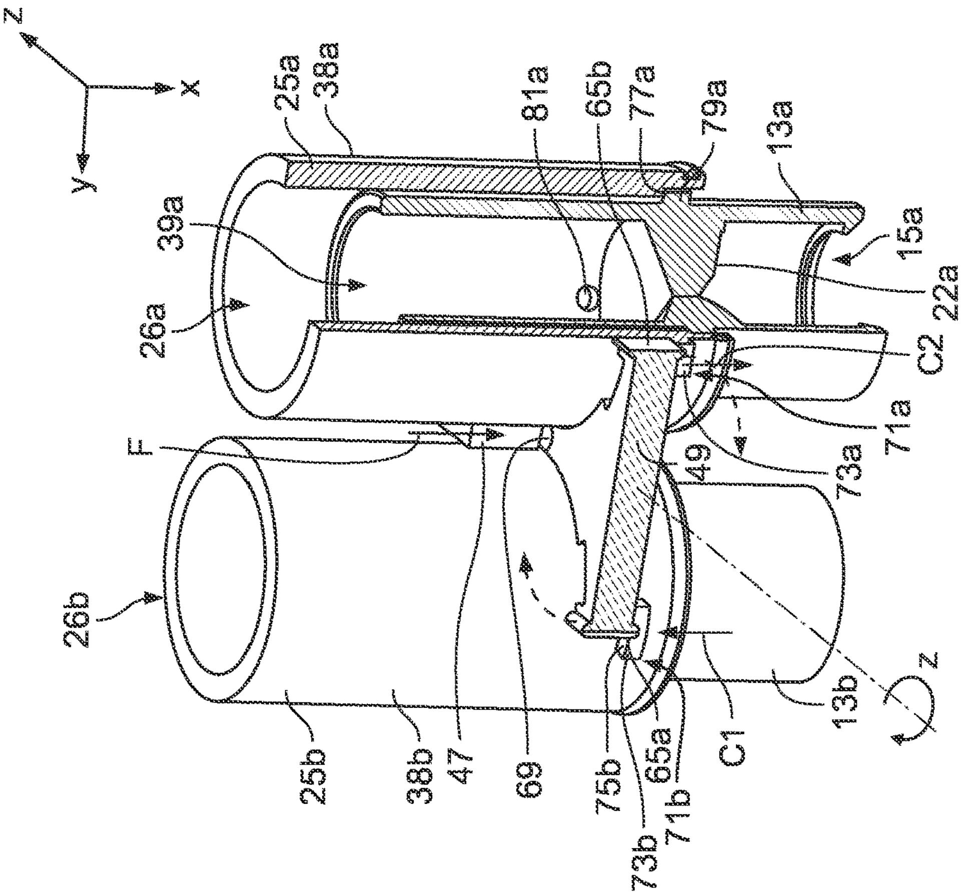
FIG. 2C shows the arrangement of the lever and the contact sleeves in the electrical connectors of FIGS. 1A and 1B.
Figure 2B:
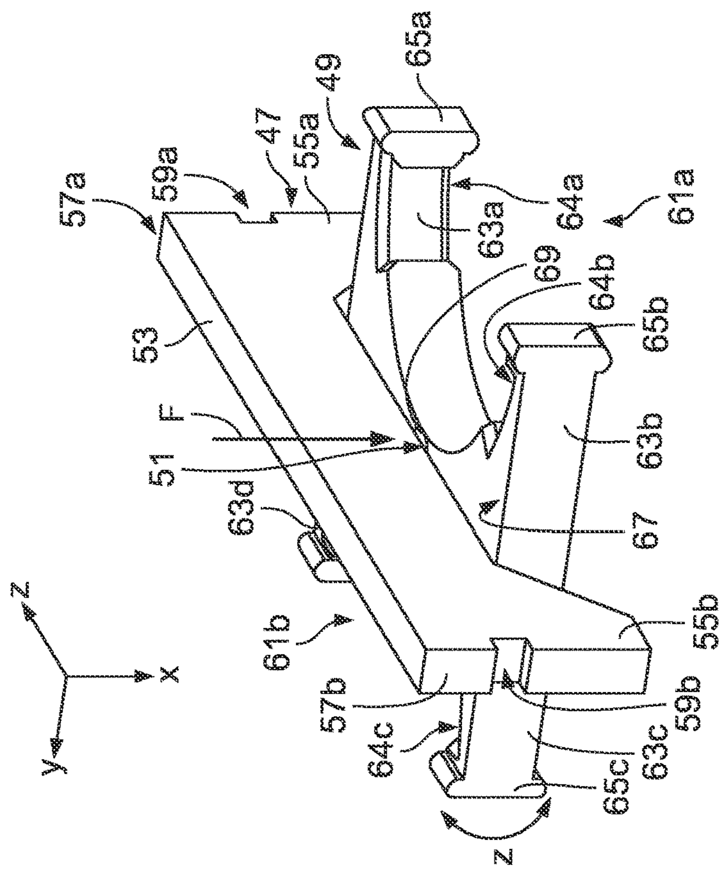
FIG. 2B shows the arrangement of the lever and the pusher element in the electrical connectors of FIGS. 1A and 1B.

FIG. 2B shows a perspective view of the lever 49 and the pusher element 47 as arranged inside the electrical connector 1. The pusher element 47 comprises a linear crossbeam section 53 configured to cross the internal space 45 defined by the inner shell 5 diametrically. When mounted into the inner shell 5 as shown in FIGS. 2A and 2D, the crossbeam section 53 crosses the internal space 5 along the direction z, orthogonal to the mating direction x and has a rectangular cross-section in the y-z plane.

The pusher element 47 comprises at both ends along the direction z lateral arms 55*a*, 55*b*, which extend from the pusher element 47 in the mating direction x and loosely envelop the lever 49. On the outward surfaces 57*a*, 57*b* of the lateral arms 55*a*, 55*b*, indentations 59*a*, 59*b* are formed to facilitate a form fit of the pusher element 49 in the inner shell 5, as can be seen in FIG. 2D described further down.

The lever 49 has the shape of a flat cuboid, in which two hemicylindrical excavations 61*a*, 61*b* have been formed from two opposing sides of said cuboid shape. The excavations 61*a*, 61*b* are configured to accommodate the contact sleeves 25*a*, 25*b*. The excavations 61*a*, 61*b* are excavated in the cuboid such that four arms 63*a*, 63*b*, 63*c*, 63*d* are formed, each at one distal corner of the cuboid. Each one of the arms 63*a*, 63*b*, 63*c*, 63*d* comprises a respective rounded load extremity 65*a*-65*d* protruding in mating direction x.

Peripheral cut-outs 64*a*, 64*b*, 64*c* are cut in the cuboid along the circumferential walls of the hemicylindrical excavations 61*a*, 61*b*. The cut-outs 64*a*, 64*b*, 64*c* facilitate passage of shearing protrusions formed on outer surfaces of the contacts sleeves 25*a*, 25*b* as shown in FIG. 2C, when the sleeves 25*a*, 25*b* are inserted through the lever 49 during mounting. Thus, the contact sleeves 25*a*, 25*b* as well as the electrical contacts 13*a*, 13*b* can be exchanged if needed within a same connector.

A top surface 67 of the lever 49 facing in the direction opposed to the mating direction x comprises a hemispherical bulge 69 in or close to its center. Alternatively, the bulge 69 can be a hemispherical or differently rounded shape protruding in the direction opposed to the mating direction x.

The pusher element 47 is arranged across the lever 49, facing the top surface 67, along a mirror symmetry plane extending along the plane z-x of the lever 49. The pusher element 47 extends between the excavations 61*a*, 61*b* such that it does not cover the excavations 61*a*, 61*b* and allows the insertion of the sleeves 25*a*, 25*b*. The lever 49 and pusher element 47 are in mechanical contact at a single interfacing point at the summit 51 of the hemispherical bulge 69 with respect to the top surface 67 of the lever 49. Thus, a fulcrum 51 is realized for the pivoting of the lever 49 on the pusher element 47. In particular, as will be explained in relation to FIG. 2C, a force F exerted by the pusher element 47 on the lever at the point 51 can generate counter forces at any of the load extremities 65*a*, 65*b*, 65*c*, 65*d* (65*c*, 65*d* not visible in FIG. 2B but on FIG. 2C) should they be engaged.

FIG. 2C shows a perspective view of the lever 49 and the contact sleeves 25*a*, 25*b* as arranged inside the electrical connector 1. The pusher element 47 is only partially illustrated. In this view, the contact sleeve 25*a*, as well as the contact 13*a* held in the sleeve 25*a*, are partially opened to illustrate internal features.

As can be seen in the partial opening of the sleeve 25*a* and the contact 13*a*, the contact 13*a* has a cylindrical shape extending in the mating direction x. The cylindrical shape is hollowed out on a front side end towards the mating direction x to form the mating receptacle 15*a* with the female mating surface 22*a*, said surface 22*a* being configured to be bottomed out against the male distal end surface 122*a* of the contact 113*a*. On a back side end facing against the mating direction x, the contact 13*a* is hollowed out to form the wiring receptacle 39*a* with the through hole 81*a*.

Each sleeve 25*a*, 25*b* comprises on its outward facing surface 38*a*, 38*b* a shearing portion 71*a*, 71*b* on which and from which mechanical shearing forces are transmitted. In this embodiment, the shearing portions 71*a*, 71*b* comprise block-shaped shearing protrusions 73*a*, 73*b*. The block-shaped shearing protrusions 73*a*, 73*b* are engaged with the load extremities 65*b*, 65*c* of the lever 49 such that mechanical shearing forces or loads can be mutually transmitted.

Each block-shaped shearing protrusion 73*a*, 73*b* comprises a load surface 75*b* facing in the direction opposed to the mating direction x. The load extremities 65*b*, 65*c* of the lever 49 rest freely on the respective load surfaces 75*a*, 75*b* of the shearing protrusions 73*a*, 73*b*. In this way, as the lever 49 pivots as illustrated by the double sided arrow around the z-axis, the load extremities 65*b*, 65*c* slide along on the load surfaces 75*a*, 75*b*, while forces are transmitted along and against axis x. Thus, a pivoting movement of the lever 49 is transformed in a longitudinal movement of the sleeves 25*a*, 25*b*. In this configuration, the load extremities 65*b*, 65*c* sliding on the load surfaces 75*a*, 75*b* with the pivoting of the lever 49 can act as cams. Thus, a linear motion is provided to the contact sleeves 25*a*, 25*b* acting as cam followers.

In one aspect of the invention, the lever 49 can be configured to pivot around the fulcrum 51 within a predetermined maximal angular displacement range, the predetermined angular maximal displacement range being defined by course limiting element on the housing limiting the movement of the lever 49. Thus, the displacement of the lever 49 in the shell of the connector can be limited to a desired range and does not impede connector design and function.

During the mating and coupling of the connectors 1, 101, the contacts 13*a*, 13*b* advance together with connector 1 as it advances towards the second connector 101, because the mating force F is applied by the pusher element 47 form-fitted in the inner shell 5 on the bulge 69. In particular, the mating force is applied on the bulge 69 located at the center of the top surface 67 of the lever 49. The force F moves the lever 49 and thus the contacts 13*a*, 13*b* forward until a first contact bottoming is reached. For example, in a case where the contact 13*b* has maximal length within manufacturing tolerance, such as N+0.5 mm, while the contact 13*a* has nominal length N, the contact 13*b* may bottom out first against its mating contact 113*b* as the surfaces 22*b*, 122*b* abut.

When the first contact bottoming occurs and the mating motion of connectors 1, 101 is continued, the load extremity 65*c* presses on the load surface 75*b*, and a counterforce C1 against the mating direction x is applied to the load extremity 65*c*. Thus, a pivoting of the lever 49 around axis z at the fulcrum 51 is caused and the load extremity 65*b* rotates with the lever, moving at least partially in the mating direction x and pushing the shearing protrusion 73*a*. Therefore, the load extremity 65*b* moves the contact sleeve 25*a* the mating direction against the resistance of the weight of sleeve 25*a*, until the contact 13*a* bottoms out against the corresponding contact 113*a* at the mating contact surfaces 22*a*, 122*a*.

Each contact sleeve 25*a*, 25*b* further comprises an internal circumferential ledge 77*a* matching a circumferential protrusion 79*a* on the external surface of the respective contact 13*a*, 13*b*. The ledge 77*a* blocks the slipping of the sleeve 25*a*, 25*b* over the respective contact 13*a*, 13*b* at a predetermined depth inside the respective internal hollow 26*a*, 26*b* of the sleeve 25*a*. In particular, the matching ledge 77*a* and the protrusion 79*a* are formed on the sleeve 25*a* and contact 13*a* respectively such that the end of the contact 13*a* comprising the wiring receptacle 39*a* is held inside the internal hollow 26*a* of the sleeve 25*a*, while the end of the contact 13*a* comprising the mating receptacle 15*a* is held outside the sleeve 25*a*.

In an alternative embodiment, the contact sleeves 25*a*, 25*b* can be simplified by omitting the internal circumferential ledges 77*a* from the internal surface of the sleeves 25*a*, 25*b*. In this configuration, the circumferential protrusions 79*a*, 79*b* on the external surface of the respective contacts 13*a*, 13*b* can be extended outwardly so as to be blocked directly on an edge of the tubular walls of the sleeves 25*a*, 25*b*.

Figure 2D:
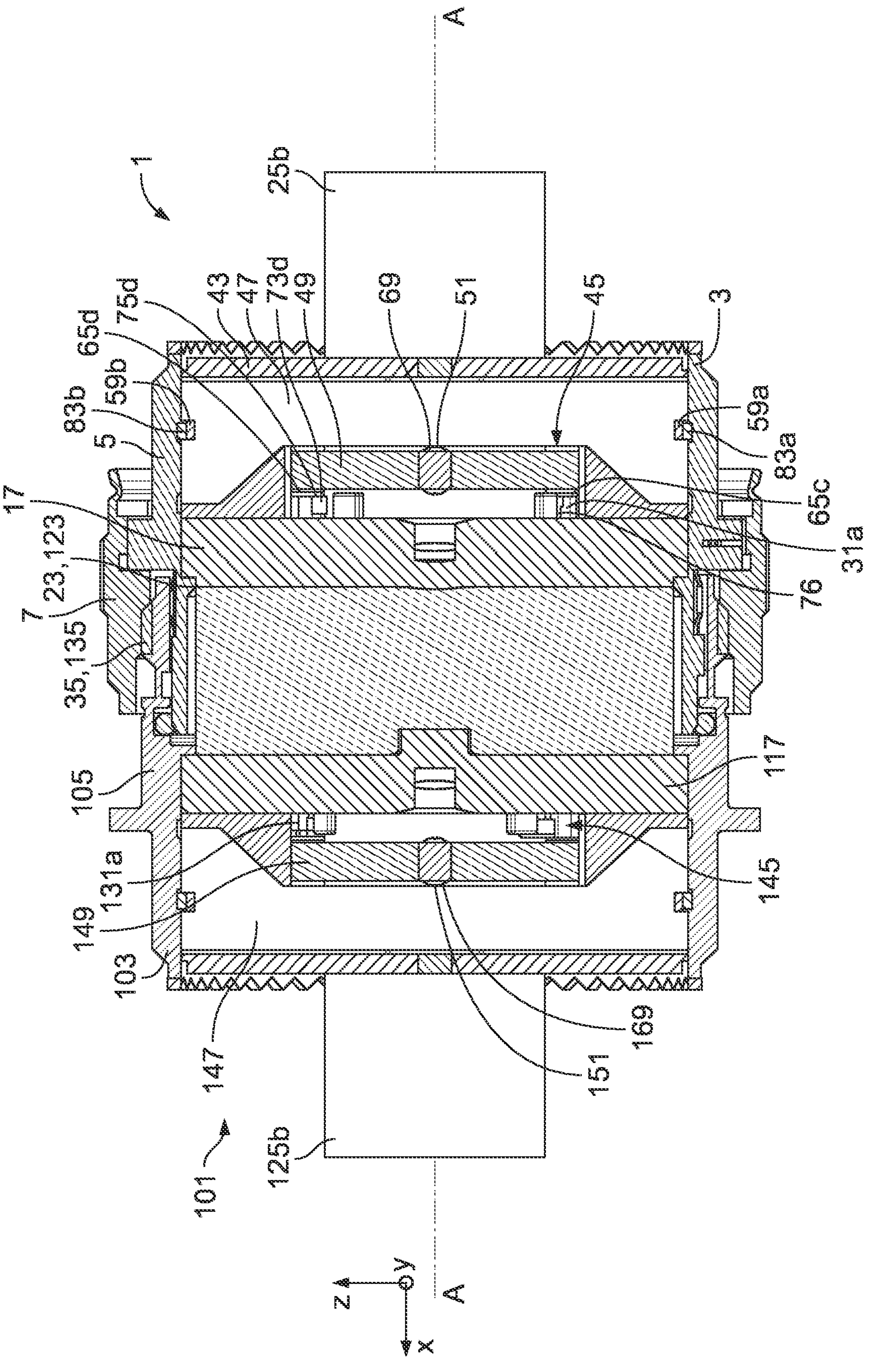
FIG. 2D shows a second cross-sectional view of the electrical connector of FIGS. 1A, 1D and the second connector of FIG. 1B in a mated state.

FIG. 2D shows a second cross-sectional view of the connectors 1, 101, this time along the x-z plane as shown in FIG. 1C. As in FIG. 2A, the connectors 1, 101 are in a fully mated state. The insulation body 117 of the second connector 101 abuts on the insulation body 17 of the connector 1, such that the interfacial surface 23 and the mating interfacial surface 123 are engaged. The threaded surface portion 35 of the outer shell 7 is screwed on the threaded surface portion 135 of the shell 105. The safety pins 31*a*, 131*a* are retracted in their respective internal connector spaces 45, 145.

FIG. 2D, together with FIG. 2A, illustrates the arrangement of the internal connector space 45 of the first connector defined by the shell 5, the insulation body 17, and the backside cover 43. In particular, FIG. 2D shows the arrangement of the lever 49 with respect to the pusher element 47 and the contact sleeves 25*a*, 25*b*.

A form fit connection between the inner shell 5 of connector 1 and the pusher element 47 is achieved by the indentations 59*a*, 59*b* of the lateral arms 63*a*, 63*b* of the pusher element 47, which are form fitted into mating recesses 83*a*, 83*b* formed in the inner shell 5. The pusher element 47 is engaged with the lever 49 at the fulcrum 51, at the summit of the bulge 69. The load extremity 65*d* of the lever 49 rests freely on a load surface 75*d* of a shearing protrusion 73*d* formed on sleeve 25*b*. The opposing load extremity 65*c* of sleeve 25*b* rests on the corresponding load surface 75*c* of the protrusion 73*c*. The load surface 75*c* and the protrusion 73*c* are hidden by a stabilizing element 76 of the insulation body 17.

FIG. 2D shows that in this embodiment, the mating second connector 101 comprises a corresponding arrangement a pusher element 147 form-fitted in the shell 105, with a lever 149 interfaced with the pusher element 147 at a fulcrum 51 realized by a bulge 149 on the lever 149. Further, not visible on this embodiment, the contact sleeves 125*b* interact with the lever 149 in the same manner as described above, and thus, the second connector 101 benefits from the same advantage as connector 1. However, in alternative arrangements, the second connector 101 can be devoid of these elements and have a generic arrangement of the sleeves and contacts.

Figure 2E:
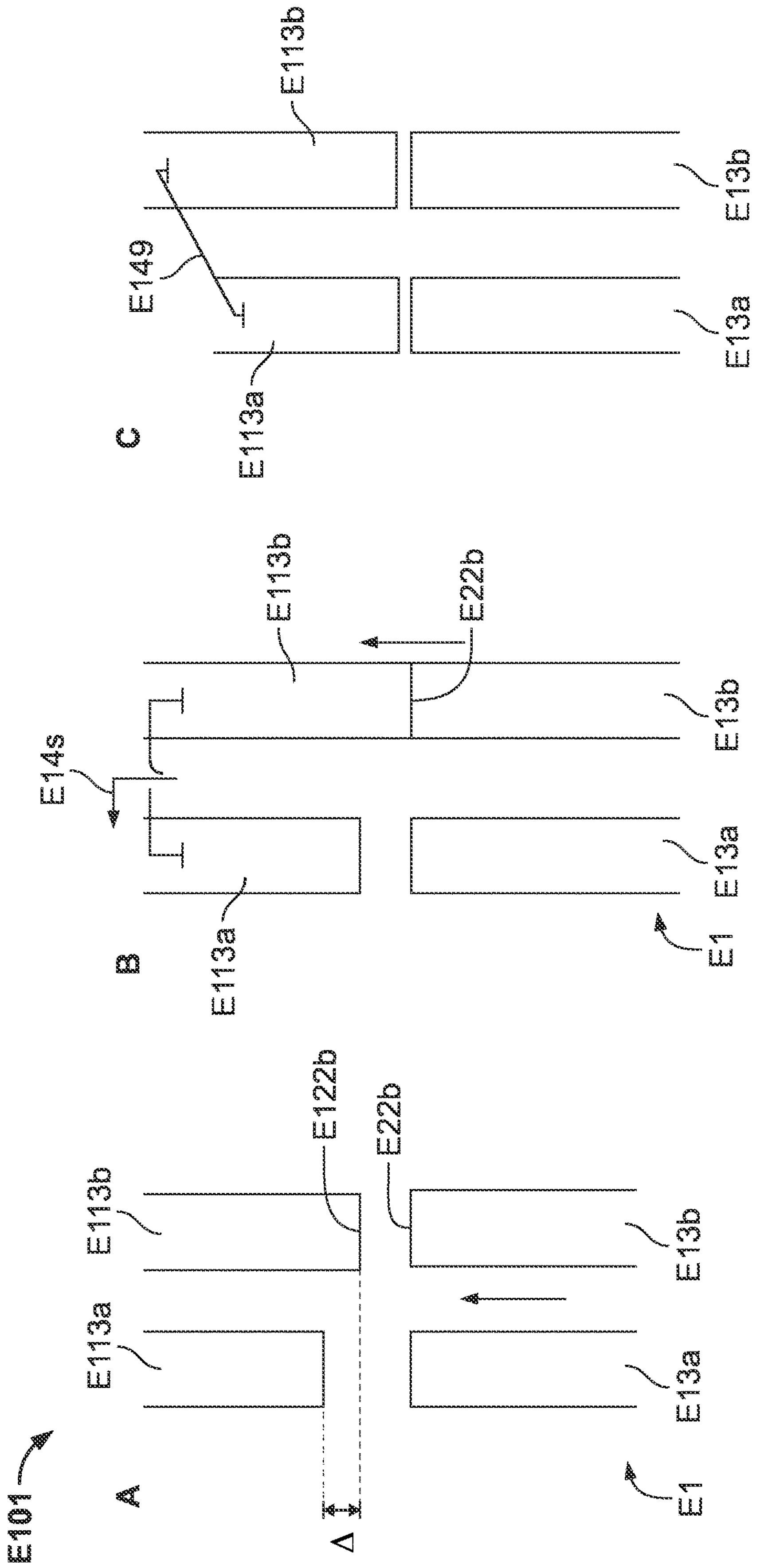
FIG. 2E illustrates a method of a lug-free connecting of a first and a second electrical connector according to the invention.

The mating sequence and the role of the lever 49 and pusher element 47 will now be described in more detail with respect to FIG. 2E. FIG. 2E depicts schematically a method of a lug-free connecting of a first electrical connector E1 having two electrical contacts E13*a*, E13*b*, with a mating second electrical connector E101 having two electrical contacts E113*a*, E113*b*.

The contacts E13*a*, E13*b*, E113*a*, E113*b* are provided in internal connector spaces of respective connector housings which have been omitted from FIG. 2D for conciseness. Each one of the contact E13*a*, E13*b*, E113*a*, E113*b* has a contact length having a value within a manufacturing tolerance range. The manufacturing tolerance range is related to limitations in the accuracy and consistency of manufacturing. Thus, electrical contacts have a non-zero length difference. In FIG. 2E, the contacts have E113*a*, E113*b* the length difference A, in which the contact E113*b* is longer than the contact E113*a*.

In a first step A, the first connector E1 is approached towards the second connector E101. The first connector E1 is approached towards the second connector E101 until a first contact bottoming occurs. When the first connector E1 is approached towards the second connector E101, a distal end surface E22*b* of the electrical contact E13*b* will abut first on the mating surface E122*b* of the mating contact E113*b*. Thus, a first contact bottoming is achieved, before any bottoming of a housing or shell of the connectors E1, E101.

In a second step B, with one distal end surface E22*b* of a first contact E13*b* abutted, a further progression of the connector E1 with respect to the other E101 leads to a pivoting of the lever E149 connected to the contact E113*b* and to the housing of connector E101 providing mechanical load. The pivoting of the lever E149 brings the second, yet unabutted, contacts E13*a*, E113*a*, closer until they bottom out against each other. At the same time, as the connector E1 continues progression towards E101, the surfaces E22*b*, E122*b* remain abutted.

In a third step C, after the lever 149 has pivoted to achieve the bottoming of each electrical contact pair E13*a*-E113*a*, E13*b*-E113*b*, the pivoted arrangement is mechanically secured. For example, the arrangement can be secured by a frictional ring such as the ring 42, providing a friction fit connection between rotating parts of a threaded housing. Thus, the bottoming out of each contact pair E13*a*-E113*a*, E13*b*-E113*b* is secured, even if exposed to vibrations. Other means of securing the connection can be used, in particular form and/or frictional fit based securing means, like a snap-on connection.

The method described above can be applied in particular to the connecting of the connectors 1, 101 described above. Therefore, as the connector 1 is mated by screwing the outer shell 7 on the shell 105 of the second connector 101, a force on fulcrum 51 is distributed to the contact sleeves 25*a*, 25*b*, until a first contact of either contact 13*a* or 13*b* bottoms out. At this point the effort is transferred efficiently to the respective second contact of either contact 13*a* or 13*b*, until all contacts are full bottomed out against their respective contacts 113*a*, 113*b*. The bottoming of connectors 1, 101 is thus not achieved in the housings 1, 3 but instead directly in the electrical contact pairs 13*a*-113*a*, 13*b*-113*b*.

This will be further illustrated with respect FIGS. 3A-3D, representing four different electrical contacting configurations. FIGS. 3A to 3D show cross-sectional views of the contacting area of the connectors 1, 101 in a fully mated state, in different electrical contact length scenarios. The four example scenarios depicted correspond cases that can typically occur as a result of fluctuations of contact lengths within manufacturing tolerances. These fluctuations increase the risk on fretting vibration occurring. However, as we will explain in the following, in each of these examples the assembly 200 can secure bottoming out of the contacts at the mating surfaces before any surfaces of the shells 5, 7, 105 of the connectors 1, 101 abut.

The cross-sectional views 3A to 3D correspond to cuts in the x-y plane as shown in FIG. 2A. In particular, in FIG. 3A the electrical contacts 113*a*, 113*b* both have nominal length N and the terminal surfaces 14, 114 of the connectors 1, 101 are separated by the gap D1. Therefore, FIG. 3A corresponds to a cut-out of FIG. 2A focused on the contacting area only.

Figure 3B:
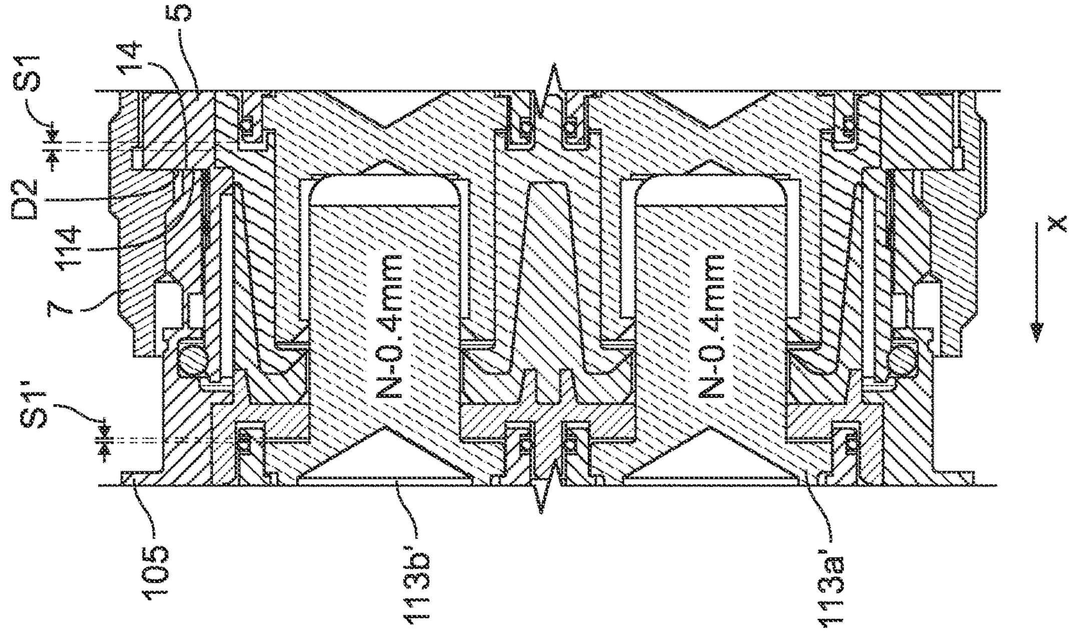
FIG. 3B shows the contacting area of the cross-section of Figure in an example in which the electrical contacts of the electrical connector have minimal length within manufacturing tolerance.

In FIG. 3B, the electrical contacts 113*a*', 113*b*' have minimal length within manufacturing tolerance, for example N−0.4 mm. The connectors 1, 101 are separated by the gap D2.

Figure 3A:
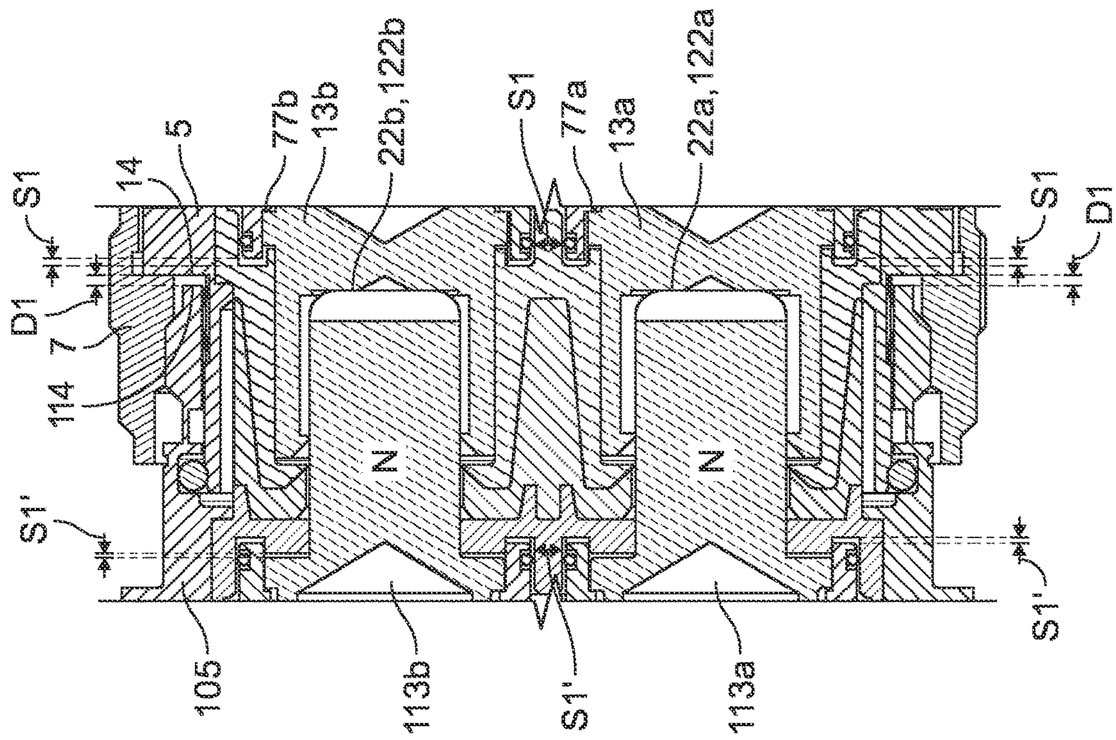
FIG. 3A shows the contacting area of the cross-section of FIG. 2A in an example in which the electrical contacts of the electrical connector have nominal length.
Figure 3D:
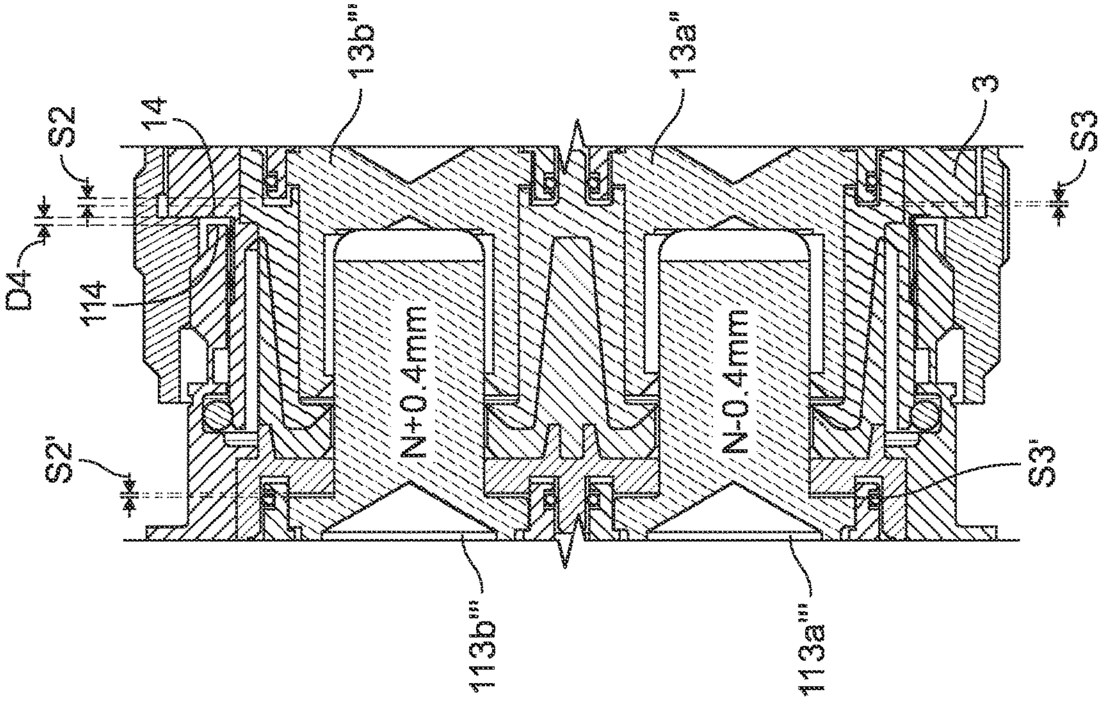
FIG. 3D shows the contacting area of the cross-section of FIG. 2A in a case in which one contact has minimal length, and another contact has maximal length, within manufacturing tolerance.
Figure 3C:
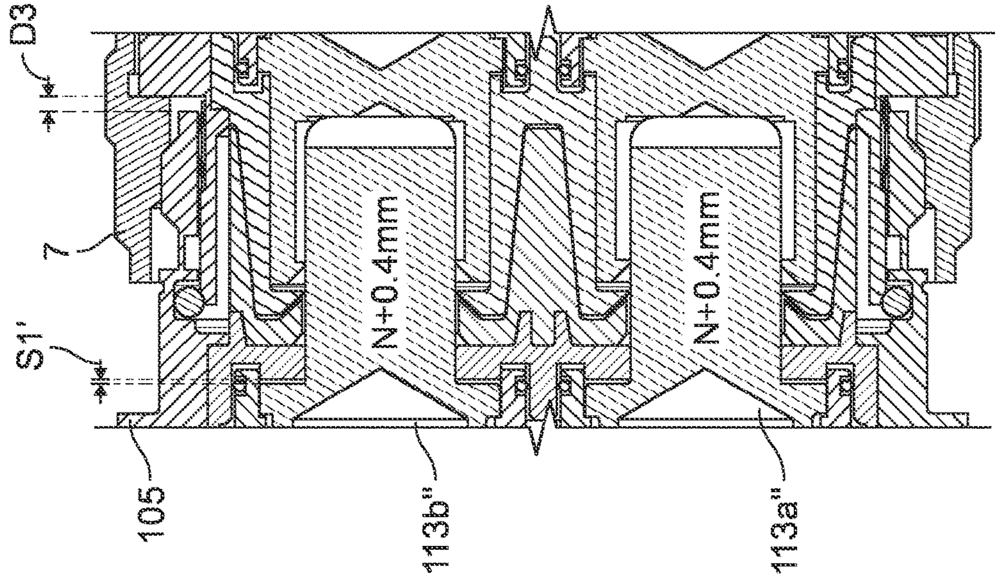
FIG. 3C shows the contacting area of the cross-section of FIG. 2A in a case where the electrical contacts of the electrical connector have maximal length within manufacturing tolerance.

In FIG. 3C, the electrical contacts 113*a*", 113*b*" have maximal length within manufacturing tolerance, for example N+0.4 mm. The connectors 1, 101 are separated by the gap D3.

In FIG. 3D, one electrical contact 113*a*''' has minimal length, for example N−0.4 mm, while the other electrical contact 113*b*''' has maximal length, for example N+0.4 mm. The connectors 1, 101 are separated by the gap D4.

In all four configurations shown, the electrical contacts 13*a*, 13*b* of the connector 1 have the same nominal length to facilitate illustration of the invention. However, deviations from nominal length in the contacts 13*a*, 13*b* of the connector 1 can be the corresponding manner by the invention as well.

In the example of FIGS. 3A and 2A, all contacts 113*a*, 113*b*, 13*a*, 13*b* have nominal length of N+/−0.0 mm. The distal end surfaces 122*a*, 112*b* abut on the female mating surfaces 22*a*, 22*b*, and the contact pairs 13*a*-113*a*, 13*b*-113*b* are bottomed out on each other. As bottoming out occurs between the contact pairs 13*a*-113*a*, 13*b*-113*b*, the gap D1 between the terminal surface 14 of the inner shell 5 and the mating terminal surface 114 of shell 105 of the second connector 101 is present. This gap D1 has a nominal value larger than the tolerance of the connector length, here for example larger than 0.5 mm.

As previously explained, the mating effort from the threading connection is transferred from outer shell 7 to the sleeves 25*a*, 25*b*, and from the sleeves 25*a*, 25*b* to the contacts 13*a*, 13*b* through the ledges 77*a*, 77*b*, until the contact pairs 13*a*-113*a*, 13*b*-113*b* are bottomed out on each other. As the shells 5, 105 are dimensioned to not bottom out on each other, the entire mating effort is transferred onto the mating contact surfaces 22*a*-122*a*, 22*b*-122*b*. Therefore, an allowance gap S1 between sleeves 25*a*, 25*b* and the insulation body 17, as well as an allowance gap S1' between sleeves 125*a*, 125*b* and the insulation body 117 is preserved at a nominal value, for example 0.2 mm. The nominal allowance gaps S1, S1' allow for elastic movement of the insulation body with the contact sleeves 25*a*, 25*b* in according with the required length compensation, as explained with respect to FIG. 3D. However, as relative movement or mechanical force occurs between the sleeves 25*a*, 25*b* and the insulation body 17, the allowance gap S1 does not change.

In FIG. 3B, as the contacts 113*a*', 113*b*' have minimal length within manufacturing tolerance, the mating and coupling by screwing of the outer shell 7 proceeds further in mating direction x, and the user has to screw the outer shell 7 further until the electrical contact pairs 13*a*'-113*a*', 13*b*'-113*b*' abut. Nevertheless an abutment of the terminal surfaces 14, 114 of the mating shells does not occur. There is still a gap D2 between bottoming of the shell 105 on the inner shell 7 of the connector 1, even though said gap D2 smaller, for example of 0.1 mm, than gap D1. As explained above, as the contact pairs 13*a*'-113*a*', 13*b*'-113*b*' are bottomed out evenly, the allowance gaps S1, S1' remain unchanged.

In FIG. 3C, as the contacts 113*a*", 113*b*" have maximal length within manufacturing tolerance, the bottoming out occurs earlier and the mating and coupling by screwing, of outer shell 7 proceeds less far along mating direction x. Therefore, the gap D3 between bottoming of outer shell 7 on shell 105 of the second connector 101 is larger, here for example 0.9 mm, than gap D1. As the contact pairs are bottomed out evenly, the allowance gaps S1, S1' remain unchanged. Again, the bottoming occurs between the end surfaces of the electrical contacts 13*a*"-113*a*", 13*b*"-113*b*" and not the shells 5, 7 105.

In FIG. 3D, the electrical contact 113*a*''' is shorter than the electrical contact 113*b*'''. Fretting corrosion building up from vibrations could thus occur if the contacts 13*a*''' and 113*a*''' are not bottomed out, i.e. are not held in abutment. The connector 1 according to this embodiment of the invention resolves this risk by providing the pivoting lever 49. The pivoting lever 49 shifts the positions of the contacts 13*a*''', 13*b*''' until all contact pairs 13*a*'''-113*a*''', 13*b*'''-113*b*''' are bottomed out.

In particular, once the longer male mating contact 113*b*''' abuts against the female electrical contact 13*b*''', any further mating progression from continued screwing of the outer shell 7 on the shell 105 transmits a force to the lever 49. In particular, a force is provided on the fulcrum 51 by the pusher element 47 such that the lever 49 pivots around axis z, until the shorter contact pair 13*a*'''-113*a*''' bottoms out as well. This is possible as the contact 13*a* and its sleeve 25*a* can move within the housing 3

The shifting of position of the contacts is accommodated by the allowances between insulation bodies 17, 117 and contact sleeves 25*a*, 25*b*. Therefore, in the contact configuration of FIG. 3D, the gaps S2, S2' between "long" contact pair 13*b*'''-113*b*''' and insulation bodies 17, 117 are increased by virtue of the pivoting of the lever 49. For example, the gaps S2, S2' are increased from 0.2 mm to 0.4 mm when the lever 49 tilts towards the "short" contact pair 13*a*''', 113*a*''', shifting relative positions of the contacts 13*a*''', 13*b*''' relatively to the housing 3.

At the same time, the gaps S3, S3' between the shorter contact 113*a*''' and it's mating contact 13*a*''' and insulation bodies 17, 117 are reduced, for example from 0.2 mm to 0.0 mm. On the "short" contact pair side, the allowance of 0.4 mm is therefore consumed. Together with the increase of the size of the gaps S2, S2' in comparison with gaps S1, S1', the length difference of 0.8 mm between contact 113$a'''$ and 113$b'''$ is accommodated, without the surfaces 14, 114 abutting. In other words, the contact pairs 13$a'''$-113$a'''$, 13$b'''$-113$b'''$ are fully bottomed out despite their contact lengths differences, as the contact lengths differences have been compensated by the pivoting lever 49, shifting the positions of the contacts 13$a'''$, 13$b'''$ relatively to the housing 3, an in particular relatively to the terminal surface 14 of the inner shell 5.

Thus, according to the invention a high-power connection with fretting corrosion resistance under vibrational load is achieved. The required resilience standards can be met without having to resort to fastened lug connections, as known from prior art. This allows for faster and simpler installation and maintenance, as well as greater safety as electrical conductors under high power are no longer exposed. Further, a greater power performance is achieved due to lower total connection mass and lower contact resistance. Further, higher voltage can be utilized and better electromagnetic compatibility with other vehicle equipment can be assured. Finally, and improved lifetime can be observed.

Figure 4:
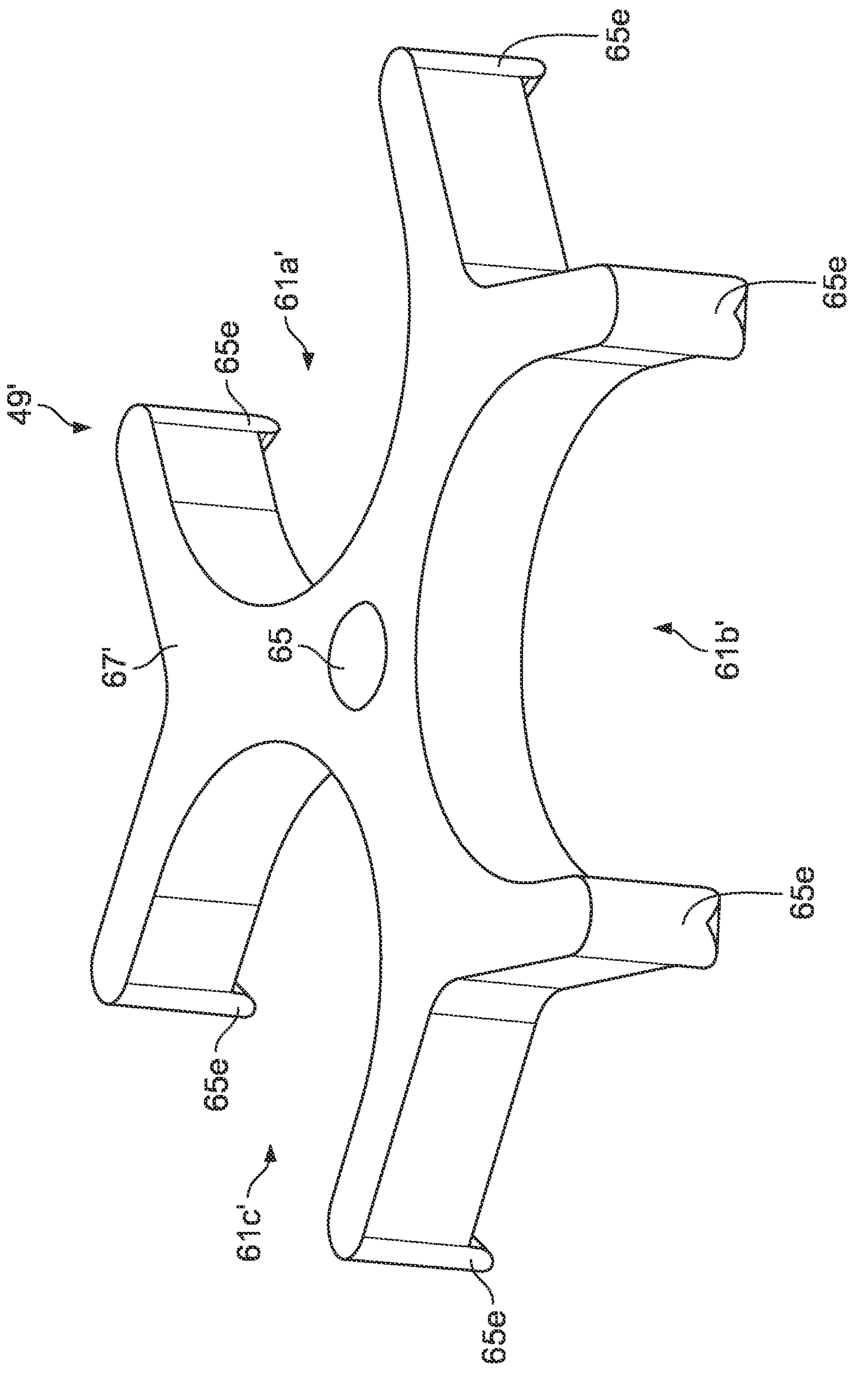
FIG. 4 shows a lever for an electrical connector according to a second embodiment of the first aspect of invention.

In further embodiments of the invention, the number of electrical contacts held by the electrical connector can be increased, for example to three. FIG. 4 shows a lever 49' for an electrical connector according to an alternative embodiment of the invention, which is formed to accommodate a third contact sleeve, for example a third sleeve in addition to contact sleeves 25$a$, 25$b$. The lever 49' comprises the centrally protruding bulge 69 protruding from a top surface 67' and three hemicylindrical excavations 61$a'$, 61$b'$, 61$c'$ which are evenly distributed around the bulge 69 to obtain a three-fold rotational symmetry. The hemicylindrical excavations 61$a'$, 61$b'$, 61$c'$ are configured to accommodate three contact sleeves. The lever 49' further comprises respective load extremities 65$e$ adjacent to each hemicylindrical excavations 61$a'$, 61$b'$, 61$c'$.

In this configuration, the lever does not pivot two-dimensionally in the x-y plane around an axis z, but can freely pivot around any axis three-dimensionally to accommodate length variations of the corresponding electrical contacts with respect to each other and the housing. This is possible because three electrical contacts of different lengths can define a plane between the three center points of their distal end surfaces. To accommodate the movement of the three-dimensional pivoting of the lever and the three corresponding contact sleeves, the corresponding pusher element can be formed for example in a Y-shape in the y-z plane, instead of a crossbeam as shown in FIG. 2B.

In order to accommodate even more contacts, further alternative embodiments can provide for additional levers layered under the lever 49 such that the additional lever's bulges are located under load extremities 65$a$-65$d$ of the lever 49. In such a "cascading arrangement", the self-adjusting nature of the electrical contacts in the connector can be preserved.

The embodiments described here-above with respect to a first aspect of the invention, as well as the described embodiment of a method according to the invention, relate to the abutment of distal end surfaces of electrical contacts, notably the mating distal end surfaces 22$a$-122$a$, 22$b$-122$b$, and E22$b$, E122$b$. It will become clear in light of the description of FIG. 9 that the invention can be achieved with any mating terminal end surfaces, and is not limited to the abutment of distal end surfaces of electrical contacts.

Figure 5:
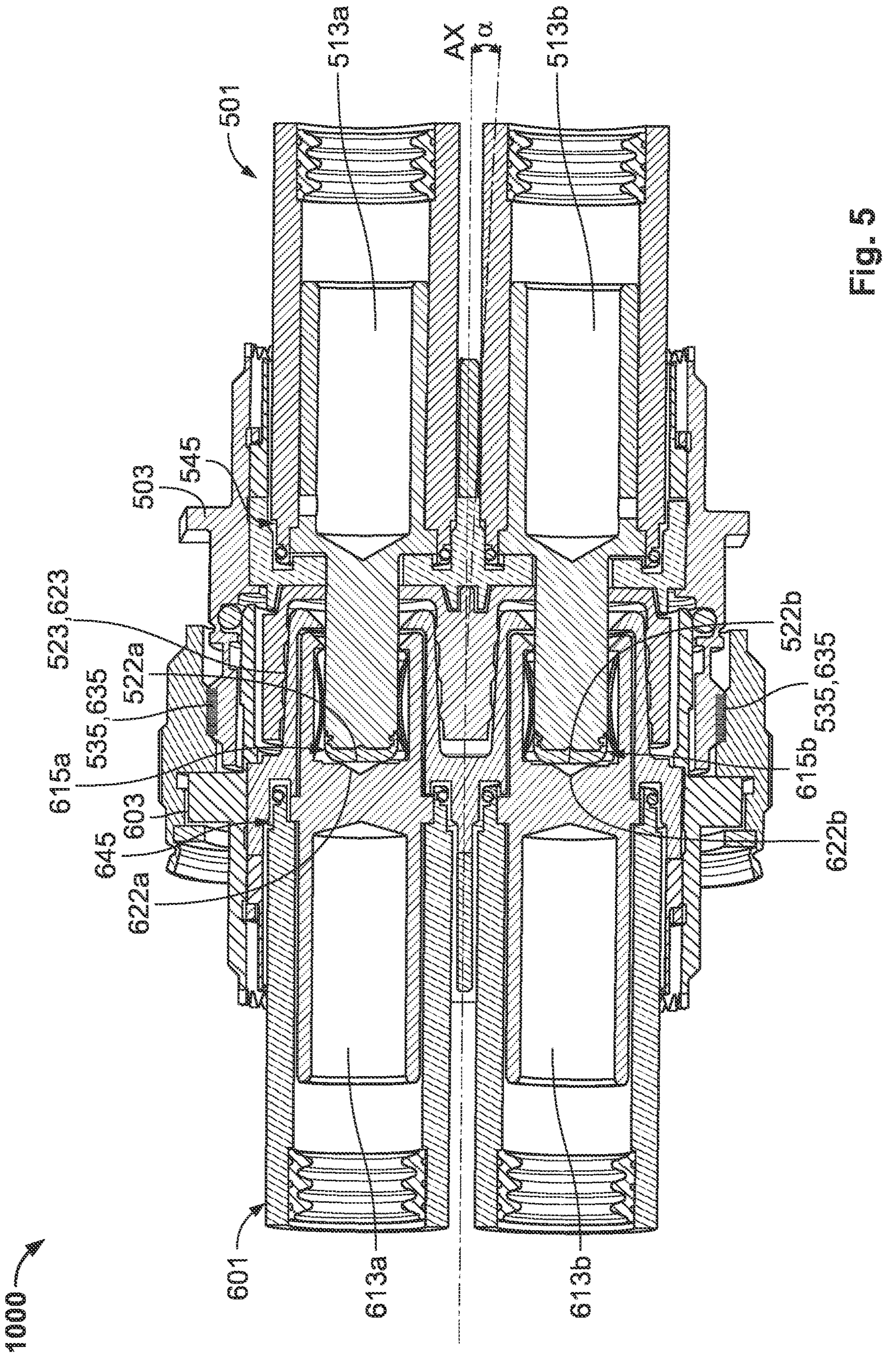
FIG. 5 shows a connector assembly according to an embodiment of a second aspect of the invention.

An embodiment of a second aspect of the invention will be described with reference to FIG. 5. FIG. 5 shows a connector assembly 1000, comprising a first electrical connector 501 and a second electrical connector 601 mated along the mating axis AX. In FIG. 5, the connectors 501, 601 are in a fully mated state.

The connector assembly 1000 does not comprise, use or resort to lug connections and is thus lug-free. Further, the connector assembly 1000 is designed with insulation and conductance specific to high power applications using currents of 50A or above, in particular specific to currents between 50 A and 1000 A.

The first connector 501 comprises a first housing 503 defining an internal connector space 545 and the second connector 601 comprises a second housing 603 defining a second internal connector space 645.

The first electrical connector 501 comprises two first electrical contacts 513$a$, 513$b$ housed in the internal connector space 545. The contacts 513$a$, 513$b$ are mated with corresponding electrical contacts 613$a$, 613$b$ of the second connector. In the embodiment of FIG. 5, connector 601 is a mobile connector and has female electrical contacts 613$a$, 613$b$. The connector 601 is configured to be screwed on the fixed connector 501 having male electrical contacts 513$a$, 513$b$. The arrangements could, according to a variant, also be reversed with the male contacts being with the mobile connector and the female contacts with the fixed connector. In this embodiment, the first and second electrical connector 501, 601 have a threading arrangement on surfaces of housing shells as already described in reference to connectors 1, 101 described in relation to the first aspect. In particular, the first connector 501 has a screw threading 535 and the second connector 601 has a nut threading 635. As mentioned above other types of connection securing elements can be employed as well.

The distal end surface 522$a$, 522$b$ of each of the first electrical contacts 513$a$, 513$b$ abuts against the respective mating surface 622$a$, 622$b$ of the receptacles 615$a$, 615$b$ of the mating corresponding electrical contact 613$a$, 613$b$. In addition, the mutual facing surfaces 523, 623 of the housings 503, 603 also abut. The distal end surfaces 522$a$, 522$b$ are the frontal end surfaces of the electrical contacts that are configured for electrical contacting and electrical power transmission, in particular by means of a planar surface engagement. For example, the planar surface engagement is perpendicular to the mating direction x.

In this example, contact 513$a$ is longer than contact 513$b$, by a length difference within manufacturing tolerance, for example longer of 0.5 mm. This length difference is thus not visible on FIG. 5, but present nonetheless and represents a fretting corrosion risk factor under vibrational load. Therefore, during mating and coupling of the connector 601 with the connector 501 by screwing as described in the previous aspect, the contact surfaces 522$a$ and 622$a$ abut first.

When the mating and coupling of the housings 503, 603 is continued after the first abutment of the contact surfaces 522$a$, 622$a$, the housing 501 tilts relatively to the housing 503 with respect to the mating axis AX towards the side of the shorter contact 513$b$.

This tilting is represented in an exaggerated form on FIG. 5 by the angle $\alpha$. The tilting by an angle $\alpha$ is enabled and mechanically secured by thread allowances between a first thread 535 of the first electrical connector 501 and a second thread 635 of the second connector 601. Due to the tilting by angle $\alpha$, the abutment of the mutual facing surfaces 523, 623 of the housings 503, 603 is released on the side from which the housing 503 tilts away, and surfaces 523, 623 only partially abut.

The tilting of the first housing 503 moves the shorter electrical contact 513*b* forward until its distal end surface 522*b* abuts against the mating surface 622*b* of the respective corresponding contact receptacle 615*a*. In particular, the tilting of the first housing 503 allows for the second abutment at surfaces 522*b*, 522*b* to be achieved while keeping surfaces 522*a*, 522*b* abutted as well.

Thus, the abutment of all electrical contact pairs 513*a*-613*a*, 513*b*-613*b* is secured by a tilted arrangement of the first housing 503 relatively to the mating second housing 603 with respect to the mating axis AX.

Thread allowances in the threadings 535, 635 allow for the tilting of the first housing 603 relatively to the second housing 503 along the mating axis AX without damaging the housings 503, 603 or endangering mechanical security of the connection. In particular, the thread allowances limit tilting to a predetermined maximal angular displacement depending on the thread allowance first and second threadings 535, 635.

The lug-free assembly 1000 allows for divergence in electrical contact lengths within manufacturing tolerances to be compensated by the tilting of the first connector housing 503 relatively to the second connector housing 603.

Figure 6:
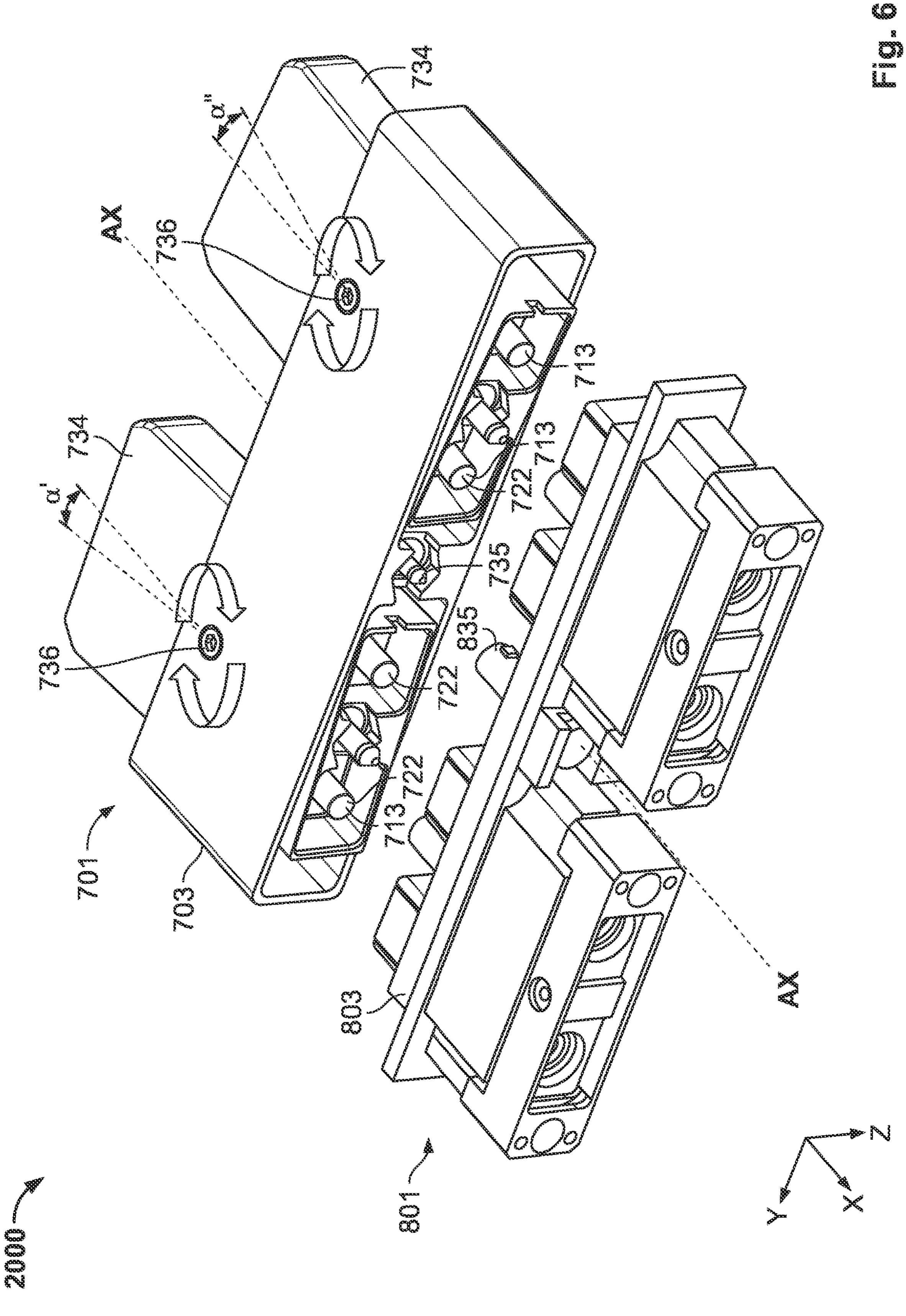
FIG. 6 shows a different embodiment of a connector assembly according to the second aspect of the invention.

Another embodiment of the second aspect of the invention is described with reference to FIG. 6. FIG. 6 provides a perspective view a first connector 701 and a second connector 801 of a lug-free electrical connector assembly according to the invention, which is suitable for high power applications using currents of 50A and higher. The first connector 701 is an electrical plug connector and the second connector 801 is an electrical receptacle connector. The first connector 701 and the second connector 801 are configured to be mated but are yet unassembled together in the view of FIG. 6.

The first electrical connector 701 has a first housing 703 and the second electrical connector 801 has a mating second housing 803. In this embodiment, the second connector 801 is a fixed connector and the first connector 701 is a mobile connector.

The housings 703, 803 of the first and of the second electrical connectors 701, 801 have a rectangular shape in a y-z plane orthogonal to the mating axis AX. In contrast to the above-described connectors 501, 701, the first housing 703 comprises a threaded plug 735 and the second housing 803 comprises a threaded receptacle 835. The mating and coupling thus occurs not by screwing of external shells, as for example described with respect to connectors 1, 101, but by screwing of a threaded central plug.

The first electrical connector further comprises four male electrical contacts 713 housed in the housing 703 and configured to be mated with mating female electrical contacts. In particular, the distal end surfaces 722 are configured to be abutted against respective mating surfaces of the corresponding electrical contacts.

The threaded plug 735 and threaded receptacle 835 extend centrally in their respective housings 703, 803 and the plug 735 is configured to be matched with the receptacle 735 during mating. In particular, to mate the connectors 701, 801, the housings 703, 803 are mated such that the plug 735 is inserted in the receptacle until the threads grip. Then, the threaded plug 735 is manually screwed with the receptacle 835.

The contacts 713 are distributed two-by-two in tilting elements 734 housed in the housing 703. In particular, the tilting elements 734 are tiltably arranged in the housing 703 by being connected to hinges 736 such that they can tilt around respective tilt axes parallel to the direction z orthogonal to the mating direction x. For example, the tiling elements 734 can tilt in the housing 703 around hinges 736 by the illustrated angles $\alpha'$, $\alpha''$.

The tiltable arrangement allows for a compensation of contact lengths differences, as already described with respect to previous arrangements: When a first contact bottoming occurs and the mating, for example by screwing plug 735 in receptacle 835, progress, the tiltable arrangement around hinges 736 allows the tilting elements 734 to tilt until a second bottoming is achieved. Thus, the bottoming of all contact pairs is achieved before the housings 703, 803 are bottomed out and the risk of fretting corrosion is reduced or cancelled.

In further alternative embodiment of the second aspect, the first electrical connector can be an electrical connector described with respect to the first aspect of the invention, for example connector 101 of FIG. 1B. In another alternative embodiment, the second electrical connector can be a mating connector described with respect to the first aspect of the invention, in particular FIG. 1A. In a further alternative embodiment, both the first connector and the second connector can be connectors 1 and 101 of the first aspect, as illustrated in FIG. 1C.

Thus, according to the invention a high-power connector assembly with fretting corrosion resistance under vibrational load is achieved. The required resilience standards can be met without having to resort to fastened lug connections, as known from prior art. This allows for faster and simpler installation and maintenance, as well as greater safety as electrical conductors under high power are no longer exposed. Further, a greater power performance is achieved due to lower total connection mass and lower contact resistance. Further, higher voltage can be utilized and better electromagnetic compatibility with other vehicle equipment can be assured. Finally, and improved lifetime can be observed.

The embodiments described here-above with respect to a second aspect of the invention relate to the abutment of distal end surfaces of electrical contacts, notably the mating distal end surfaces 522*a*-622*a*, 522*b*-622*b* and 722. It will become clear in light of the description of FIG. 9 that the invention can be achieved with any mating terminal end surfaces, and is not limited to the abutment of distal end surfaces of electrical contacts.

An embodiment of a lug-free connector assembly according to a third aspect of the invention will now be described with references to FIGS. 7A and 7B.

Figure 7A:
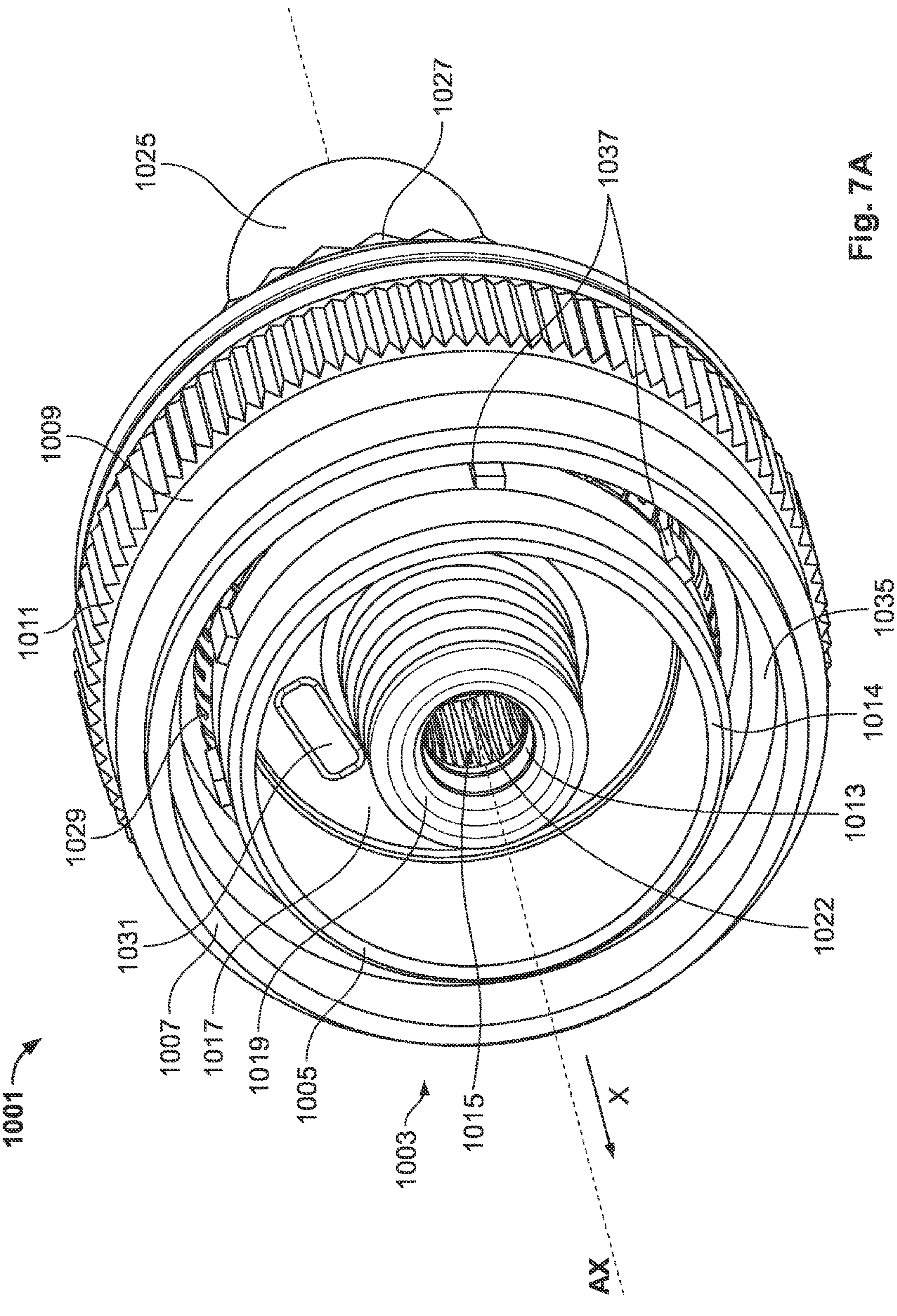
FIG. 7A shows a perspective view of a connector for a lug-free connector assembly according to an embodiment of a third aspect of the invention.

FIG. 7A shows a perspective view of a first electrical connector 1001 for a lug-free connector assembly according to an embodiment of the third aspect of the invention. The first electrical connector 1001 shares many structural elements with the electrical connector 1 illustrated in FIG. 1A in relation to the first embodiment of the invention.

Figure 7B:
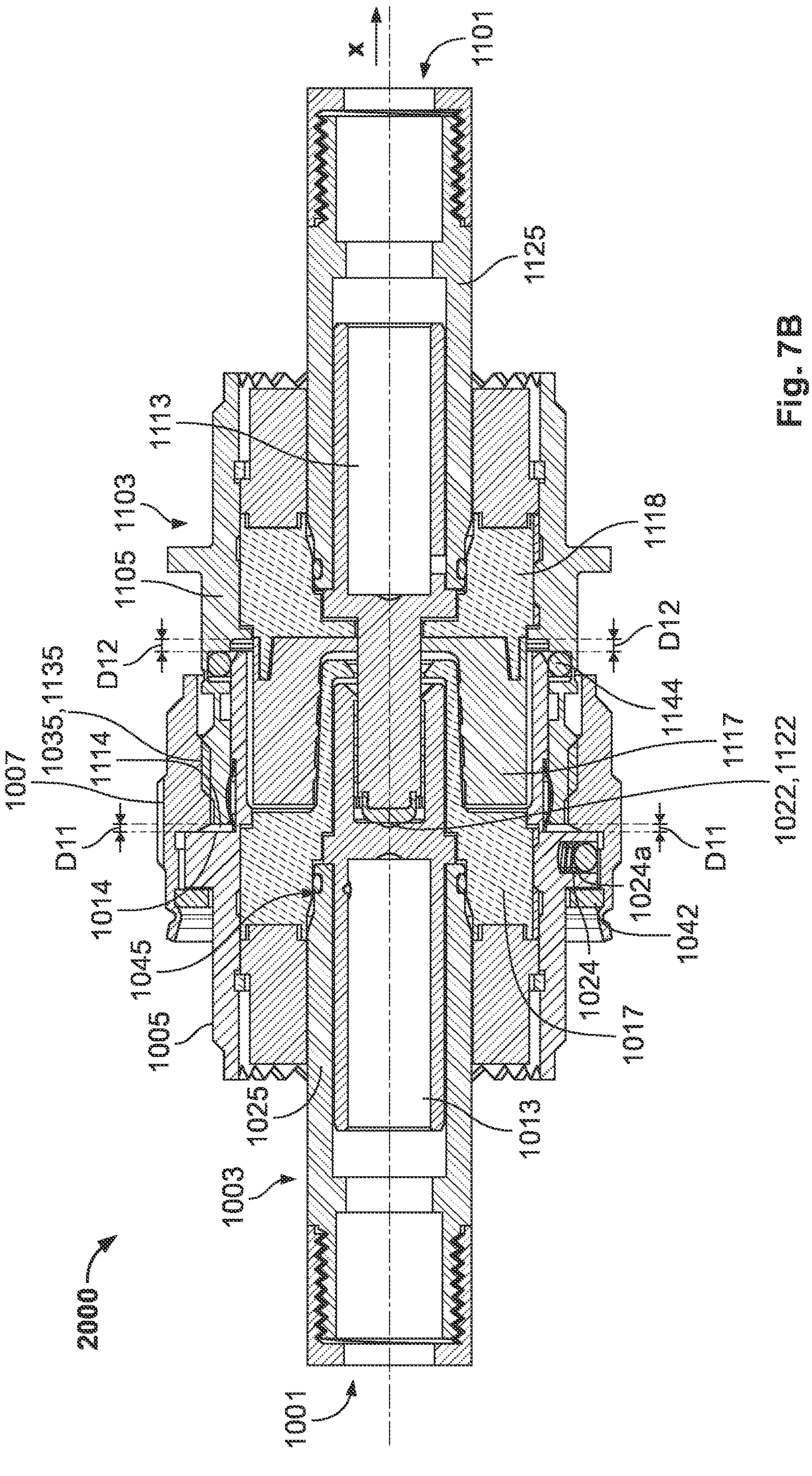
FIG. 7B shows cross-sectional view the lug-free connector assembly comprising the connector of FIG. 7A.

In particular, the first electrical connector 1001 is configured to be mated in the mating direction x parallel to the mating axis AX with a mating second electrical connector, for example the second electrical connector 1101 illustrated in FIG. 7B. The electrical connector 1001 is also mobile connector, also called plug connector, to be manually mated with a fixed, or immobile, mating second connector also called receptacle. For example, the electrical connector 1001 is suited to establish power transmission connection for a power cable in an electrical vehicle, e.g. an electrical aircraft.

The electrical connector 1001 also comprises a housing 1003, including an inner shell 1005 with a shell terminal surface 1014, and surrounded by an outer shell 1007 having an outermost surface 1009 and a rugged surface portion 1011. The shell terminal surface 1014 is furthest, or outermost, surface or ridge of the connector 1001 in the direction of the mating with the mating connector, that is, in the mating direction x.

The electrical connector 1001 further comprises an interfacial thermoplastic insulation body 1017 with a protrusion 1019, centering keys 1037 provided on the outer surface of the inner shell 1005, a jagged outer circumferential ridge 1027 on the outer shell 1007 and a metallic band 1029 between the shells 1005, 1007. The connector 1001 also comprises a threaded surface portion 1035. The threaded surface portion 1035 is a nut thread realizing a mechanical coupling device for the coupling of the connector 1001 with a mating second electrical connector. In variants of the invention, other mechanical coupling devices can be used, such as friction-fit devices or clipping devices.

However, in contrast to the other embodiments, he electrical connector 1001 only comprises only one electrical socket contact 1013 located inside the inner shell 1005, extending inside the housing 1003 in parallel to the mating axis AX. The contact 1013 comprises a receptacle 1015 configured to receive a male contact of a mating second connector. The receptacle 1015 of the contact 1013 matches an opening 1021 in the insulation body 1017. The receptacle 1015 comprises an end surface 1022 representing the primary electrical power contacting surface of the electrical socket contact 1013.

The electrical socket contact 1013 is held in a hollow contact sleeve 1025 used to fit and lock the electrical contact 1013 in the housing 1003. In addition, the connector 1001 comprises a safety pin 1031 that is moveable between a safe and an unsafe position. In the view of FIG. 7A, the electrical contact 1013 and the contact sleeve 1025 is fully locked in the housing 1003, which is indicated by the safety pins 1031 that are in a safe position, in which the pin 1031 is fully retracted inside the housing 1003. In case, for example, either the sleeve 1025 or the contact 1013 is incorrectly assembled in the housing 1003, the safety pin 1031 moves into an unsafe position in which the pin 1031 protrudes from the housing 1003 in the mating direction x of the respective mating connector, for example the second electrical connector 1101. In the unsafe position, the protruding safety pin 1031 prevents mating of the connector 1001 with a mating electrical connector.

FIG. 7B shows in a cross-sectional view the lug-free connector assembly 2000 comprising the connector 1001 of FIG. 7A, and a second electrical connector 1101. The view of FIG. 7B relates to a single-contact lug-free connector assembly and corresponds to the views illustrated in FIGS. 2A and 5 relating to double-contact connector assemblies. The internal configuration of the connectors 1001, 1101 matches the internal configurations of the connectors described with respect to previously described aspects, but simplified to comprise only a single electrical contact.

In particular, the connector 1001 is mated with the second electrical connector 1101 by screwing together of the nut thread 1035 of the first housing 1003 with a plug thread 1135 formed on a shell 1105 of the second housing 1103 of the second electrical connector 1101. In alternative embodiments, the connector 1001 and the second electrical connector 1101 can be coupled by a mechanical coupling means different from the threads 1035, 1135. For example, other friction fit and/or form fit mechanical coupling means for the coupling of connectors 1001, 1101 may be used, such as snap-fit clipping devices.

As shown in FIG. 7B, the first housing 1003 of the first electrical connector 1001 defines an internal connector space 1045 and houses the contact sleeve 1025 holding the electrical contact 1013. Correspondingly, the second housing 1103 houses the corresponding electrical contact 1113. The second housing 1103 also houses an insulation body 1117, for example an elastomer, mating the insulation body 1017 of the first connector 1001. A secondary insulation layer 1118 in the second housing 1103 provides additional contact fitting and insulation properties. An O-ring 1144 on an inside of the shell 1105 of the second connector 1101 provides additional sealing for the coupling with the first connector 1001. As described with respect to first aspect, a frictional ring 1042 is disposed circumferentially around the inner shell 1005 such that it is in partial frictional contact with the outer shell 1007 and secures the rotational state of the outer shell 1007 with respect to the inner shell 1005.

As the contact 1013 is an electrical socket or female contact, the corresponding electrical contact 1113 is a male contact. As already known from the embodiment of the first aspect described with reference to FIGS. 1A to 2D, the corresponding electrical contact 1113 is removably form-fit in a contact sleeve 1125, which in turn is removably form-fit in the housing 1101.

FIG. 7B shows an assembly of the first electrical connector 1001 and the second electrical connector 1101 in a fully mated and coupled state, in which the distal end surface 1022 of the first electrical contact 1013 abuts against the respective mating male distal end surface 1122 of the corresponding electrical contact 1113. The distal end surfaces 1022, 1122 are the frontal end surfaces of the electrical contacts that are configured for electrical contacting and electrical power transmission, in particular by means of a planar surface engagement. For example, the planar surface engagement is perpendicular to the mating direction x. For example, in the case of a female electrical contact such as contact 1113, the distal end surface is the bottom surface of the contact receptacle 1115.

In particular, the distal end surfaces 1022 and 1122 abut while the first and second housing 1003, 1103, mated through the threaded portions 1035, 1135, are not bottomed out against each other. This can be achieved for example by dimensioning the nominal lengths of the contacts 1013, 1113, and their fittings in the housings 1003, 1103 such that the shell terminal surface 1014 of first housing 1003 the first electrical connector 1001 does not abut against its respective shell terminal surface 1114 of the second housing 1103 of the second electrical connector 1101.

Instead, while the distal end surfaces 1022, 1122 of the contacts are bottomed out against each other, the shell terminal surfaces 1014, 1114 are separated by a distance D11. Similarly, the inner shell 1005 of the housing 1003 of the first electrical connector 1001 is not bottomed out in mating direction x on a surface of the housing 1103 of the second electrical connector 1101, but still separated by a distance D12. Alternative extremity surfaces of the housings 1003, 1103 in mating direction x are also still separated by a distance D12, as shown in FIG. 7B. Thus, in the same fashion as previously described aspects, the bottoming out of the connectors is transferred from the housings 1003, 1103 to the contacts 1013, 1113, in particular the contacting end surface 1022 and distal end surface 1122. The bottomed-out contacts 1013, 1113 are thus less subject to vibration-induced relative motion and fretting corrosion is reduced or eliminated.

FIG. 7B also illustrates an anti-decoupling device 1024. The anti-decoupling device 1024 is arranged in a portion of the inner shell 1005 of the housing 1003 such that a spring-actuated ball lock 1024*a* of the anti-decoupling device 1024 abuts against the outer shell 1007. It maintains the outer shell 1097, in particular when the ball enters a corresponding recess in the outer shell 1007, statically place in a given rotational state with respect to the inner shell 1005 and thus prevents an unwanted decoupling.

The embodiments described here-above with respect to a third aspect of the invention relate to the abutment of distal end surfaces of electrical contacts, notably the mating distal end surfaces 1022-1122. It will become clear in light of the description of FIG. 9 that the invention can be achieved with any mating terminal end surfaces, and is not limited to the abutment of distal end surfaces of electrical contacts.

A tool and a method for removing a contact sleeve 125 from the electrical connector 101, will now be described with reference to FIG. 8. The inventive concept of removal of a contact sleeve 125 from the electrical connector can also be realized for any kind of electrical connector, in particular an electrical connector for high-power vehicle applications, independent of the connectors described above with respect to FIGS. 1 to 7.

Figure 8:
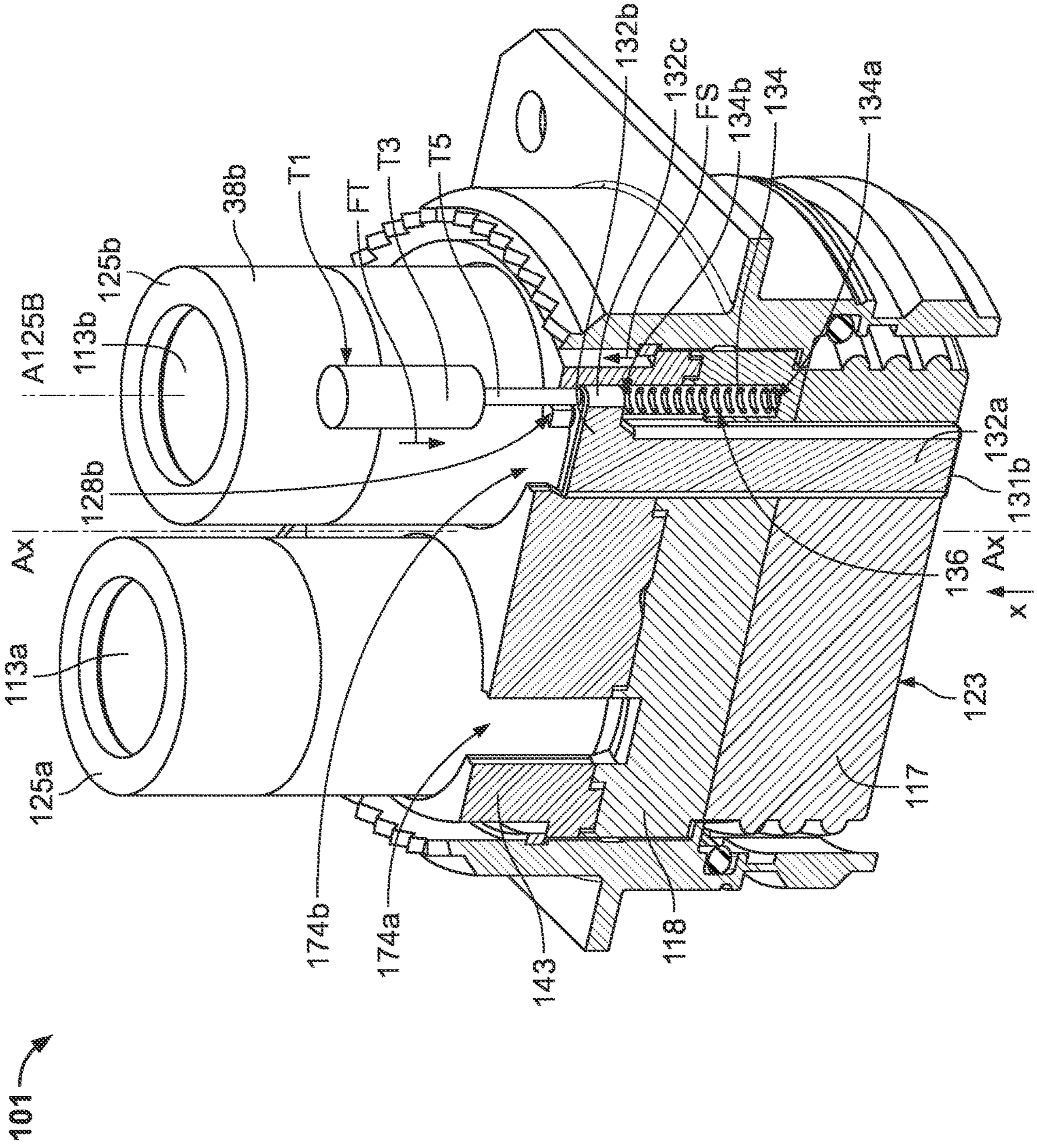
FIG. 8 shows a view of the second connector of FIG. 1B in the context of a contact sleeve removal using a sleeve removal tool.

FIG. 8 shows a partial cut view of the second connector 101 described previously according to a first aspect of the invention. The second connector 101 has already been described in detail with respect to FIGS. 1B, 1C, 2A, 2D and 3A to 3D, in particular with respect to FIG. 1B. Features carrying reference numbers already used will not be described in detail again but reference is made to their description above.

FIG. 8 corresponds to an off-center cross-sectional view of the connector 101, that is, a cross-sectional view laterally removed from the mating axis Ax corresponding to the center axis of the connector 101 to visualize internal components.

In addition to the second connector 101, FIG. 8 also represents an external sleeve removal tool T1. The sleeve removal tool T1 comprises a first cylindrical portion T3 and a second cylindrical portion T5, formed together in one part. The second portion T5 extends coaxially from the first portion T3. The first portion T3 has a larger, in particular two to four times larger, diameter than the second portion T5. To facilitate manual gripping and handling of the tool T1, the diameter of the second portion T5 is adapted for insertion in a corresponding opening 128*b* arranged in the second connector 101.

In alternative embodiments, to further facilitate the gripping of the second portion T5, the enlarged second portion T5 can for example be key-shaped or cuboid instead of cylindrical.

The opening 128*b* is arranged adjacent to the position of the contact sleeve 125*b*, in particular in the backside cover 143. The opening 128*b* has a diameter than is more than five times, in particular more than 10 times smaller than the diameter of the contact sleeves 125*b*.

The sleeve removal tool T1 is needed to allow the removal of an electrical contact sleeve 125*b* for an electrical contact in the electrical connector 101. The sleeve removal tool T1 is insertable in a corresponding opening 128*b* and to displace a safety pin 131*b* as described in one of the aspects of the present disclosure, e.g. in FIG. 1B.

The pin 131*b* is moveable between a safe and an unsafe position, wherein in the unsafe position the safety pin protrudes outside the connector 101 away from the insulation body 117 and prevents the mating of the connector 101 with the electrical connector 1, like illustrated in FIG. 1C.

In FIG. 8 the safety pin 131*b* is moved in the safe position, in which the safety pin 131*b* is fully retracted inside the connector 101. The safety pin 131*b* extends throughout the second connector 101, in particular through cut-out spaces in the elastomer insulation body 117, the secondary thermoplastic insulation body 118 and the backside cover 143. As already described in the foregoing with respect to FIGS. 1A to 2D, as the safety pin 131*b* is retracted, it does not protrude from the connector 101 and thus does not block a mating and/or coupling of the connector 101 with the mating electrical connector 1 anymore.

The safety pin 131*b* has an L-shaped body, with the long arm 132*a* of the body extending along the mating axis Ax through the second connector 101. The short arm 132*b* is disposed orthogonally to the mating direction x on a side of the connector 101 facing in mating direction x. The extremity 132*c* of the short arm 132*b* extends into the space formed by the opening 128*b*. Thus, the extremity 132*c* of the safety pin 131*b* can be engaged by the insertion of an object, in particular by an insertion of the second portion T5 of the tool T1, into the opening 128*b*.

As mentioned in the foregoing description of the first aspect of the invention in FIGS. 1A to 3D, the second connector 101 comprises a spring arrangement. In particular, as shown on FIG. 8, the connector 101 comprises a spring element 134 lodged inside a spring space 136. In this embodiment, the spring element 134 is a helical coil spring arranged in parallel to the mating axis Ax, that is, such that the restoring spring force FS is directed in parallel to the mating axis Ax.

A first end 134*a* of the spring element 134 is abutting against the connector 101, in particular to the secondary thermoplastic insulation body 117. A second end 134*b* of the spring element 134 is abutting against the extremity 132*c* of the short arm 132*b* of the safety pin 131*b*. In this spring arrangement, the spring element 134 is pre-loaded such that a spring force FS acts on the extremity 132*c* of the safety pin 131*b* and pushes it in mating direction x along the mating axis Ax against the cover 149 of the connector 101.

The retracted safety pin 131*b* blocks the sleeve 125*b* from being rotated, for example due to an unwanted manually or environmental action, around its central axis A125B. The blocking of the rotation of the sleeve 125*b* around its axis A125B in the safe position is obtained by virtue of the shearing protrusion 73*b*, whose structure and function are described in detail above with reference to FIG. 2C but is not visible on FIG. 8. The shearing protrusion 73*b* protrudes from the outward facing surface 38*b*, and therefore, a rotation of the sleeve 125*b* around its axis A125B is blocked when the shearing protrusion 73*b* hits the retracted safety pin 131*b*.

To remove the contact sleeve 125*b*, for example to check, maintain or exchange the fitted electrical contact 113*b*, the second portion T5 of the sleeve removal tool T1 is introduced into the opening 128*b*. As the removal tool T1 is pushed into the opening 128*b* with at least a predetermined force FT, the restoring spring force FS can be overcome and the safety pin 131*b* is displaced along the mating axis from the safe position, into an unsafe position in which the safety pin 131*b* protrudes outwardly from the interfacial surface 123 from the second connector 101.

In the unsafe position, the contact sleeve 125*b* can be rotated around its axis A125*b* such that the shearing protrusion 73*b* moves out of its position in a recess inside the connector and is no longer blocked by the long arm 132*a* of the safety pin 131*b*. In particular, the contact sleeve 125*b* can be rotated into a position in which the contact sleeve 125*b* can be extracted from the connector 101 by passing the shearing protrusion 73*b* through a corresponding guiding space 174*a*, 174*b* in the connector 101.

Conversely, in an unsafe position, the contact sleeve 125*b* is not rotated around its axis A125*b* into its correctly locked position. Thus, the shearing protrusion 73*b* is not rotated with the contact sleeve 125*b* into its final place but remains at least partially in the guiding space 74*b*, blocking the spring-actuated upward movement of the outwardly extended safety pin 131*b* to retract back into the connector 101.

In this fashion, the arrangement of the safety pin 131*b* can prevent a mating of the connector 101 with a mating connector 1 as long as the contact sleeve 125*b* is not correctly installed in the intended rotational position around its central axis A125B.

The same mechanism can be foreseen for the second contact sleeve 125*a*, which is also removably arranged.

A corresponding mechanism, in particular a corresponding spring and through hole, can be arranged on the other side, on FIG. 8 not visible side of the connector 101, concerning the other safety pin 31*a* and contact sleeve 25*a*.

The method and structural features described here above with respect to the second connector 101 of the first aspect of the invention can be applied in identical fashion to any other connector, in particular to connector 1 according to the present invention.

Figure 9:
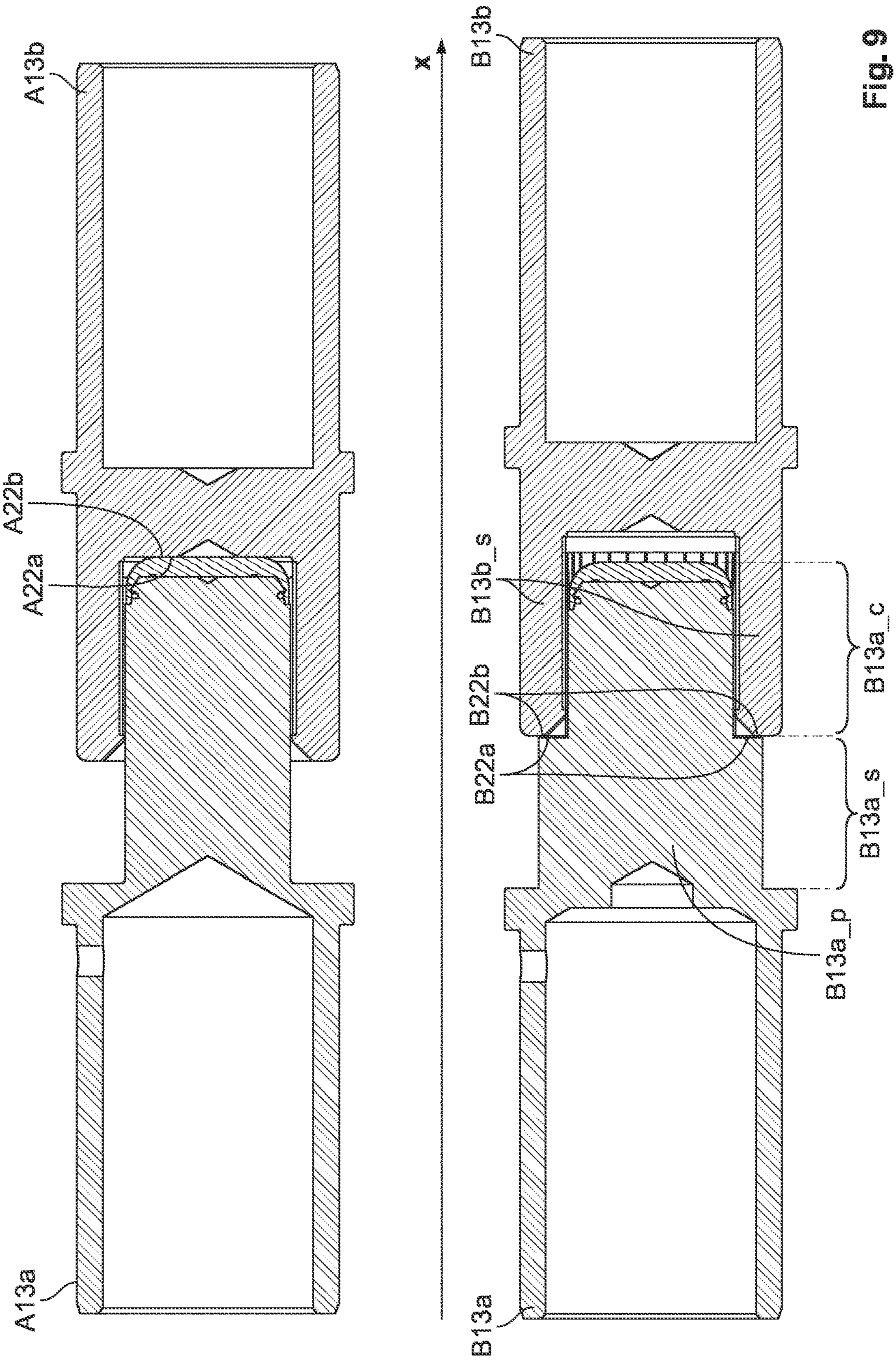
FIG. 9 shows a comparative view of an alternative pair of electrical contacts.

FIG. 9 shows a comparative view of an alternative pair of electrical contacts. In particular, FIG. 9 shows side-by-side a first pair of electrical contacts A13*a*-A13*b*, corresponding to the electrical contact pairs 13*a*-13*b*, 113*a*-113*b*, 513*a*-513*b*, 613*a*-613*b*, 1013-1113 as described above, and, as an alternative, a second pair of electrical contacts B13*a*-B13*b*.

The electrical contact A13*a* is a plug-type electrical contact and the other electrical contact A13*b* is a receptacle-type electrical contact. In FIG. 9, the mating electrical contacts A13*a*, A13*b* bottom out at their respective terminal end surfaces A22*a*, A22*b*. Here, the distal end surface A22*a* abuts against the bottom of the female receptacle corresponding the terminal end surface A22*b*.

However, the invention is not limited to this type of connector. The electrical contacts B13*a*, B13*b* of FIG. 9 illustrate an alternative. In the alternative, the electrical contact B13*b* corresponds to the electrical contact A13*b* and is a receptacle-type electrical contact, and the electrical contact B13*a* is still a plug-type electrical contact.

The plug B13*a_p* of the contact B13*a* has a central protruding portion B13*a_c* encircled by a retracted portion B13*a_s*, which does not extend as far in the mating direction x as the protruding portion B13*a_c*. Here, the retracted portion B13*a_s* abuts with and bottoms out on the distal end surface B22*b* of the receptacle shell B13*b_s* of the receptacle contact B13*b*. Thus, in this embodiment, it is a distal end surface B22*b* of the electrical contact B13*b* that abuts against the terminal end surface B22*a* of the retracted portion B22*_s* of the electrical contact B13*a*.

In the example of FIG. 9, the surfaces A22*a*, A22*b* and B22*a* are planar and orthogonal to the mating direction x. However, the mating terminal end surfaces of the electrical contacts may also be inclined with respect to that mating axis x.

Although each aspect of the invention has been described in relation to particular examples, the invention is not limited the described embodiments, and numerous alterations to the disclosed embodiments can be made without departing from the scope of this invention. The individual features included in the various embodiments can be freely combined with each other to obtain further embodiments or examples according to the invention.

What is claimed is:

1. An electrical connector, comprising a housing defining an internal connector space and mateable with a mating housing of a second electrical connector in a mating direction parallel to a mating axis;

a pair of electrical contacts housed in the internal connector space and mateable with a plurality of second electrical contacts of the second electrical connector;

a lever housed in the internal connector space, a mechanical contact between the housing and the lever establishes a fulcrum of the lever, the fulcrum is arranged between the electrical contacts, a pivoting of the lever moves a position of the electrical contacts relative to the housing.

2. The electrical connector of claim 1, wherein the housing has a shell and a pusher element disposed in the internal connector space and rigidly attached to the shell, the pusher element realizes the mechanical contact between the housing and the lever at the fulcrum.

3. The electrical connector of claim 1, wherein the pivoting of the lever moves the position of the electrical contacts relative to the housing along the mating axis.

4. The electrical connector of claim 1, wherein the lever has a protrusion protruding from a surface of the lever in a direction opposite the mating direction.

5. The electrical connector of claim 4, wherein an extremity of the protrusion is a point of the mechanical contact with the housing establishing the fulcrum.

6. The electrical connector of claim 1, further comprising a safety pin movable between a safe position and an unsafe position, the safety pin prevents the mating of the electrical connector with the second electrical connector in the unsafe position by protruding from the housing and blocking the second electrical connector.

7. The electrical connector of claim 6, wherein the safety pin is one of a plurality of safety pins each corresponding to one of a plurality of contact sleeves, each of the electrical contacts is held in one of the plurality of contact sleeves.

8. The electrical connector of claim 1, wherein each of the electrical contacts is held in a contact sleeve, each contact sleeve has a shearing portion establishing a mechanical contact with the lever.

9. The electrical connector of claim 8, wherein the shearing portion has a protrusion with a load surface facing in a direction opposite the mating direction, the load surface receives a mechanical load from the lever.

10. The electrical connector of claim 9, wherein the load surface of each of the contact sleeves abuts against one of a plurality of load extremities of the lever.

11. The electrical connector of claim 10, wherein each of load extremities rests freely on the load surface of one of the contact sleeves and is slidable on the load surface.

12. An electrical connector assembly, comprising:

an electrical connector including a housing defining an internal connector space, a pair of electrical contacts housed in the internal connector space, and a lever housed in the internal connector space, a mechanical contact between the housing and the lever establishes a fulcrum of the lever, the fulcrum is arranged between the electrical contacts, a pivoting of the lever moves a position of the electrical contacts relative to the housing; and a second connector including a mating housing mateable with the housing of the electrical connector and a plurality of second electrical contacts mateable with the electrical contacts of the electrical connector, the lever is pivoted around the fulcrum such that each of the electrical contacts is bottomed out against a respective one of the second electrical contacts.

13. A lug-free electrical connector assembly, comprising:

a first connector including a housing defining an internal connector space and a pair of electrical contacts housed in the internal connector space; and a second connector mateable with the first connector along a mating axis, the second connector including a mating housing mateable with the housing of the first connector and a plurality of second electrical contacts mateable with the electrical contacts of the first connector, a terminal end surface of each of the electrical contacts at least partially abuts against a respective mating surface of a corresponding electrical contact receptacle of one of the second electrical contacts, abutment of the electrical contacts with the second electrical contacts is secured by a tilted arrangement of the first housing relative to the mating housing with respect to the mating axis.

14. The lug-free electrical connector assembly of claim 13, wherein the lug-free electrical connector assembly is used in a high power application with currents of at least 50 A.

15. The lug-free electrical connector assembly of claim 13, wherein the housing of the first connector is coupled with the second connector, tilting of the housing of the first connector relative to the mating housing is enabled by a plurality of gap allowances between a first mechanical coupling device of the first connector and a second mechanical coupling device of the second connector.

16. The lug-free electrical connector assembly of claim 15, wherein the first mechanical coupling device is a screw thread and the second mechanical coupling device is a nut thread.

17. The lug-free electrical connector assembly of claim 15, wherein, in the tilted arrangement, the housing of the first connector and the mating housing only partially abut.

18. A lug-free electrical connector assembly, comprising:

a first electrical connector including a first housing defining an internal connector space and having an electrical socket contact housed in the internal connector space; and a second electrical connector mateable with the first electrical connector along a mating axis, the second electrical connector having a second housing mateable with the first housing and a second electrical contact mateable with the electrical socket contact, a terminal end surface of the electrical socket contact at least partially abuts against a mating terminal end surface of the second electrical contact, a shell terminal surface of the first housing does not abut against a shell terminal surface of the second housing.

19. The lug-free electrical connector assembly of claim 18, wherein:

the electrical socket contact is held in a first contact sleeve that is removably positioned in the first housing; and/or the second electrical contact is held in a second contact sleeve removably positioned in the second housing.

20. The lug-free electrical connector assembly of claim 19, wherein the first electrical connector has a first safety pin and/or the second electrical connector has a second safety pin, at least one of the first safety pin and the second safety pin is movable between a safe position and an unsafe position, the at least one of the first safety pin and the second safety pin prevents mating of the first electrical connector and the second electrical connector by protruding from one of the first housing and the second housing.

* * * * *